United States Patent
Conklin et al.

(10) Patent No.: US 7,310,333 B1
(45) Date of Patent: ***Dec. 18, 2007

(54) SWITCHING CONTROL MECHANISM FOR SUPPORTING RECONFIGUARATION WITHOUT INVOKING A REARRANGEMENT ALGORITHM

(75) Inventors: Richard Conklin, Gainesville, GA (US); Jeffrey T. Gullicksen, Mountain View, CA (US)

(73) Assignee: Ciena Corporation, Linthicum, MD (US)

( * ) Notice: Subject to any disclaimer, the term of this patent is extended or adjusted under 35 U.S.C. 154(b) by 911 days.

This patent is subject to a terminal disclaimer.

(21) Appl. No.: 10/608,492

(22) Filed: Jun. 30, 2003

Related U.S. Application Data

(60) Provisional application No. 60/392,461, filed on Jun. 28, 2002.

(51) Int. Cl.
*H01Q 11/00* (2006.01)
(52) U.S. Cl. ...................... 370/388; 370/390
(58) Field of Classification Search ............... 370/254, 370/388, 354; 340/2.21, 2.26; 385/17, 24
See application file for complete search history.

(56) References Cited

U.S. PATENT DOCUMENTS

| | | | | |
|---|---|---|---|---|
| 4,926,416 A | * | 5/1990 | Weik | 370/354 |
| 5,745,612 A | * | 4/1998 | Wang et al. | 385/24 |
| 5,917,426 A | * | 6/1999 | Yoshifuji | 340/2.26 |
| 6,087,958 A | * | 7/2000 | Arzt | 340/2.21 |
| 6,542,655 B1 | * | 4/2003 | Dragone | 385/17 |
| 7,106,729 B1 | * | 9/2006 | Gullicksen et al. | 370/388 |
| 7,154,887 B2 | * | 12/2006 | Wu et al. | 370/388 |
| 2005/0157713 A1 | * | 7/2005 | Klausmeier et al. | 370/388 |

* cited by examiner

*Primary Examiner*—Chi Pham
*Assistant Examiner*—Albert T. Chou
(74) *Attorney, Agent, or Firm*—Clements Walker; Christopher L. Bernard; Tyler S. Brown

(57) ABSTRACT

A method of modeling or constructing a switch element uses an ingress stage with input sorters and input routers; an egress stage with output routers and output sorters; and a center stage interconnecting the ingress and egress stages. Routers are partitioned such that each partition is assigned to only one data line. A switch controller and method may use such modeling to advantage. For example, during initial configuration of the switch element, a subset of connections are excluded from a control algorithm that initially configures the switch with the subset being subjected to post processing. Furthermore, a fast rearrangement of the switch rearranges only part of the existing connections and then adds/deletes cross connects as necessary to complete the connections.

35 Claims, 15 Drawing Sheets

| | Working Timeslot is Dropped for Failure at TLSR Link = | | | | | | | | | | | | | | Flattened Drop TimeSlot(ISITS) |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | |
| 0 | | | | | | | | | | | | | | | |
| 1 | | | | | | | | | | | | | | | |
| 2 | | | | | | | | | | | | | | | |
| 147455 | | | | | | | | | | | | | | | |
| | 1 bit Each | | | | | | | | | | | | | | 18 bits |

FIG. 6e

SWITCHING CONTROL MECHANISM FOR SUPPORTING RECONFIGUARATION WITHOUT INVOKING A REARRANGEMENT ALGORITHM

CROSS REFERENCE TO RELATED APPLICATIONS

This application claims the benefit of priority under 35 U.S.C. § 119(e) to U.S. Provisional 60/392,461 Application Ser. No. filed on Jun. 28, 2002 the entirety of which is hereby incorporated by reference.

FIELD OF THE INVENTION

The present invention generally relates to a switching control mechanism for a switch element that interconnects high-speed data lines.

BACKGROUND OF THE INVENTION

Switches or switch elements are interconnected within a communication network in order to direct data from one point to another point within the network. Typically, each switch element has a plurality of inputs and a corresponding plurality of outputs. Network connections can be coupled to each of the switch element inputs and outputs. Typically, data carried on any input line of a switch element can be switched to any output line on the same switch element. Conventional switch devices typically use rearrangement or control algorithms, such as Paull's algorithm or the Looping algorithm, to establish initial configurations for the switch element.

Networks, however, do not remain fixed. Rather, frequently, some network connections are added, while others are dropped. Alternatively, data previously intended for one switch output line may be required to be shifted to another output line. In general, switching events output line may be required to be shifted to another output line. In general, switching events may occur, which would require the network connections across the switch element to be manipulated. Due to the number of connections across a single switching element, compensating for a switching event can be a complex and computationally intensive procedure. Examples of switching events include instances when network connections are added to a switch element already in use or instances when one of the links between network elements fails and another route through the network element is needed.

When switching events require new connections to be formed, conventional switch elements must be reconfigured. Many switch elements comprise devices, which are grouped into one of three stages of a three stage Clos network (i.e., within an ingress stage, a center stage or an egress stage). In response to switching events, typically, all of the switching devices in the Clos network (including those related to connections that are not directly affected by the switching event) need to be reconfigured to form new connections through the switch element.

A conventional switch element in such a rearrangeable, non-blocking switching configuration typically requires considerable computational resources to accomplish reconfiguration of the switching devices within the switch element at the speed required by such standards as SONET (Synchronous Optical Network) or SDH (Synchronous Digital Hierarchy) which requires, for example, restoration switch events to be completed within 50 ms. Due to the complexities of the algorithms used to establish such reconfigurations for switch elements, it can become even more difficult to repeatedly execute control algorithms in a manner that ensures switching events are compensated for while being transparent to the end-user. Conventional control algorithms are computationally intensive and can be intermittently unpredictable in temporal length to compute. As such, use of these algorithms for the purpose of performing rearrangements of switches with existing connections can result in unacceptable delays.

One-way to speed the reconfiguration process is to pre-configure portions of the Clos network to support change. For example, the center stage of the Clos network can be pre-configured to include standby connections. The stand-by connections can be used to realize changes in the network to support various protocols (i.e., protection protocols) or otherwise allow for reconfiguration of the network element in response to a switching event. The stand-by connections can be quickly realized without having to run resource intensive rearrangement algorithms. However, such pre-configured connections require sufficient bandwidth in the center stage, such bandwidth that is unavailable for conventional operations (i.e., over-provisioned bandwidth, that is, bandwidth over and above necessary bandwidth to support point-to-point connections).

Accordingly, there is a need for a new switching control mechanism, which provides for faster performance in response to switching events and does not require over-provisioned bandwidth.

BRIEF DESCRIPTION OF THE DRAWINGS

The following drawings illustrate by way of example, and not by way of limitation, embodiments of the present invention in which like reference numerals refer to similar elements and in which:

FIG. 3b is a method for initializing connections in a switch element modeled in accordance with FIG. 3a.

FIG. 6b illustrates a method for performing a switchover in response to a switch event in a switch element configured to support VLSR pass-through.

FIG. 6e shows a TLSR drop table.

DETAILED DESCRIPTION OF THE INVENTION

Figure 1A:
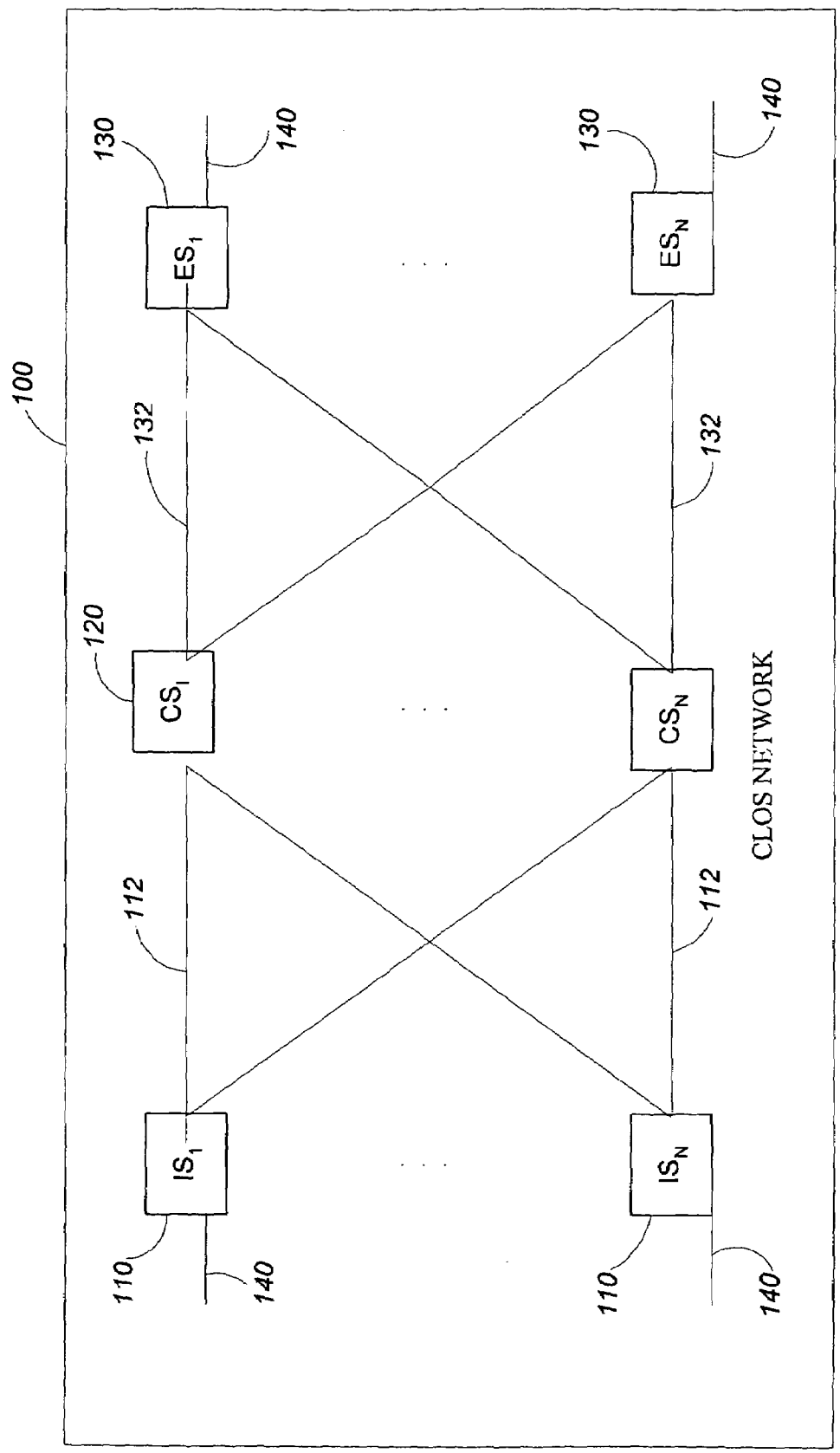
FIG. 1a is a block diagram illustrating a Clos network that has applications for switching control mechanisms.

In the following description, for the purposes of explanation, numerous specific details of an embodiment of the present invention are set forth in order to provide a thorough understanding of the present invention. It will be apparent, however, that the present invention may be practiced without some of these specific details.

A. Terminology

A switch element connects one set of data lines to another set of data lines. As described herein, the switch element may comprise ingress devices, center stage devices, and egress devices. Embodiments of the invention provide that the devices of the switch element form a Clos network.

An ingress device is a component of the switch element that can be configured to switch incoming communications from one or more data lines to one or more selected center stage devices, or to one or more selected center stage device ports.

An egress device is a component of the switch element that can be configured to switch communications from one or more center stage devices to one or more data lines that connect to the switch element.

A center stage device is a component of the switch element that interconnects the ingress devices with the egress devices. One or more center stage devices may physically reside on a switch module (SM).

Both ingress and egress devices may physically reside on a line module (LM) that is connected to a switch module SM. In one implementation, a line module LM comprises one ingress device and one egress device.

A bank is a device programming memory that controls an ingress, egress, or center stage device. An ingress device, an egress device, and a center stage device may contain two banks, bank A and bank B, of memory used to program the device. A bank may be either the active bank or the standby bank. One of the banks will be the active bank and the other will be the standby bank. When bank A is the active bank, bank B is the standby bank. When bank B is the active bank, bank A is the standby bank. The active bank programming specifies the device programming currently applied to the device. The standby bank programming specifies a device programming to be used for the device programming at a future time. In one implementation, the ingress device, the egress device, and the center stage device all switch banks from active to standby (and standby to active) simultaneously. In such an implementation, changes to the active bank programming memory immediately update the device while changes to the standby bank programming memory update the device at a later time when all the devices perform a coordinated bank switch.

A router is a functional aspect of an ingress or egress device that connects that ingress/egress device to a selected center stage device or center stage device's port.

A sorter is a functional aspect of an ingress or egress device that connects a data line coupled to an ingress or egress device to a plurality of routers of that ingress or egress device.

In one implementation, ingress, egress, and center stage devices are switches. These devices may be formed by a combination of circuitry, memory, and multiplexers. Functional aspects of these devices, such as routers and sorters, may be implemented using internal components of the devices.

An edge connection is a link between an ingress device and a center stage device, or between the center stage device and an egress device.

A connection refers to interconnected components of a switch element that combine to enable one data line connected to one side of the switch element to communicate to another data line on another side of the switch element. Each connection may use an ingress device, a center stage device, and an egress device.

A switching event is an event that causes one or more of the devices in a switching element to be reconfigured. Examples of switching events include a path failure, a line failure, or a component failure. The switching event may occur on the ingress side, the egress side, both the ingress and the egress sides, or internally in the switch element.

B. Overview

In the following discussion, for illustrative purposes, implementations of the invention will be described in the context of a 3-stage Clos network. It should be noted, however, that if so desired, the concepts taught herein may be applied to other switching configurations. Such applications are within the scope of this invention.

1. Physical Clos Network

FIG. 1a is a block diagram illustrating a Clos network 100 within a network element, such as a CoreDirector® switch manufactured by CIENA Corporation of Linthicum, Md., that can have applications for switching control mechanisms. The Clos network 100 includes a plurality of ingress stage switches 110, a plurality of center stage switches 120, and a plurality of egress stage switches 130. A first set of edge connections (or edges) 112 connects the ingress stage switches 110 to the center stage switches 120. A second set of edges 132 connects the center stage switches 120 to the egress stage switches 130. Each edge 112 in the first set carries a certain amount of bandwidth. Likewise, each edge 132 in the second set carries bandwidth. While edges 112, 132 in each set are assumed to carry the same amount of bandwidth as other edges in the same set, sometimes edges in the same set can carry different amounts of bandwidth.

Switch elements for high-speed data lines are structured into Clos networks in order to connect high-speed data lines 140 to one another. For example, a first set of data lines 140 may be connected to a second set of data lines 140 across a Clos type switch element. The switch element 100 can be configured to initially connect the data lines 140 in a first configuration, and to reconnect the data lines in case of switching events.

Embodiments of the invention may be implemented using the 3-stage Clos network configuration. According to one implementation, the ingress stage switches 110 are each symmetrically connected to all center stage switches 120. Similarly, the egress stage switches 130 are each symmetrically connected to all of the center stage switches 120. The symmetrical connections between ingress and egress stage switches to the center stage switches may be accomplished by configuring the switch element so that the amount of bandwidth carried by the ingress stage switches and egress stage switches are the same. Furthermore, in one implementation the size of the ingress stage switches and egress stage switches are the same, for any symmetrical pair. While relationships for creating symmetry across a Clos type switch element are described herein, it is possible for one skilled in the art to apply the teachings disclosed herein to asymmetrical switch elements.

Figure 1B:
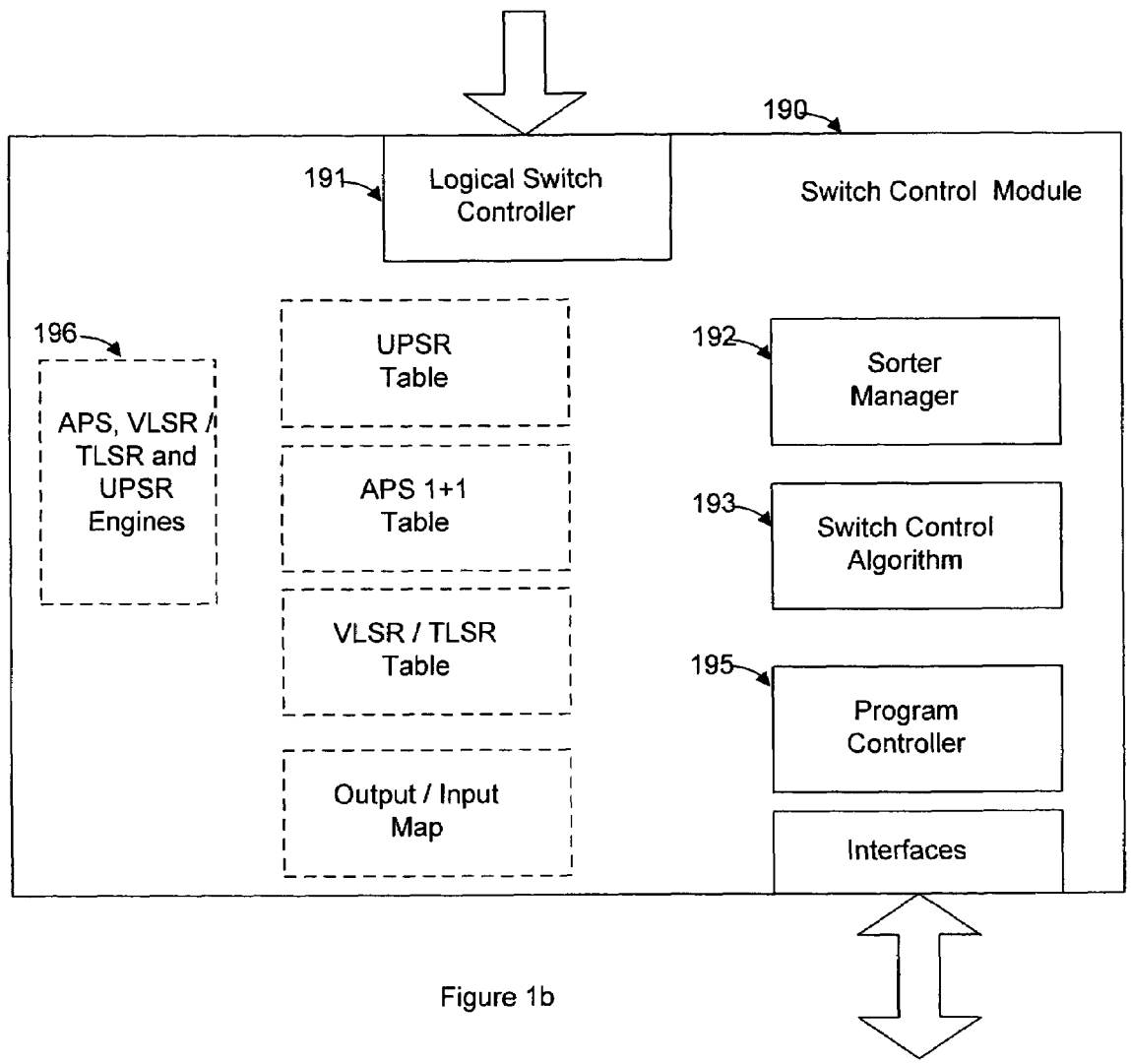
FIG. 1b is a block diagram illustrating a switch control module that has applications for switching control mechanisms.

FIG. 1b shows an embodiment of a switch control module 190, such as can be found within a network element 110, 120 or 130, such as a CoreDirector® switch, available from CIENA Corporation, that can be used to configure a switch element. The switching control module 190 includes a logical switch controller 191, a sorter manager 192, a switch control algorithm encapsulating the rearrangement algorithm 193, a program controller 195, various connection protocol support engines including APS, VLSR/TLSR, and UPSR engines 196 and interfaces for communicating with various other modules embodying components of the switch element. In addition, the switch control module 190 includes various tables for storing connection information created during the connection setup process. Examples of tables include an output/input (O/I) table, a UPSR connection table, and a VLSR/TLSR connection table. While software defined tables are described herein, it is possible for one skilled in the art to apply the teachings disclosed herein to hardware based switching components. The operation and interaction of the switch control module 190 and the switch element are described in greater detail below.

2. Logical Modeling/Partitioning

Figure 2:
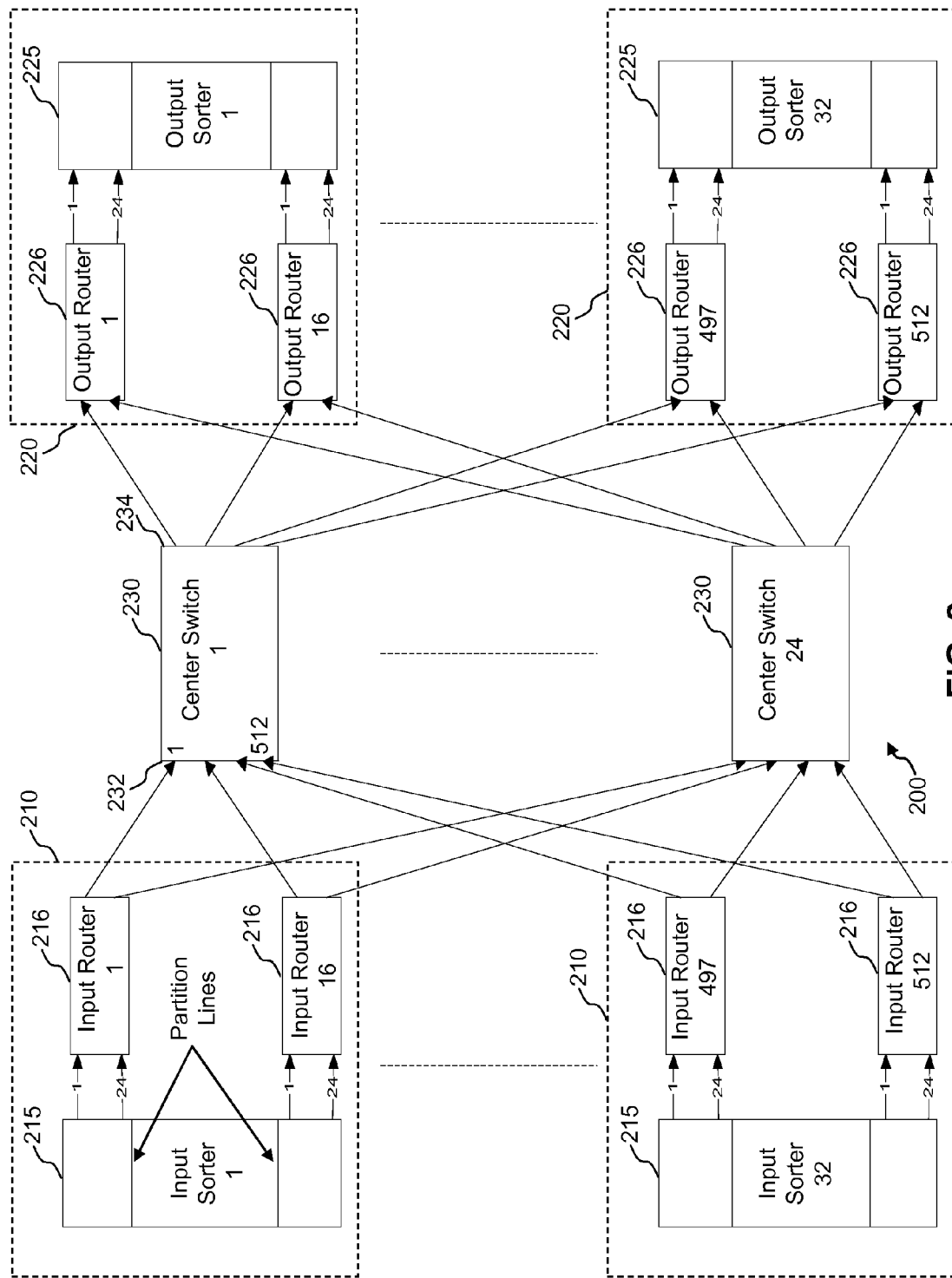
FIG. 2 is a block diagram illustrating a logical model for the Clos network of FIG. 1.

In one implementation, use of a control algorithm is avoided by modeling the various devices in a switch element. An example of such a model is illustrated in FIG. 2. Such a model enables selective rearrangement of connections across the switch element to be achieved in an efficient manner. As shown in FIG. 2, a physical three stage Clos network switch element 100 (such as that shown in FIG. 1) can be modeled as a five-stage logical switch element 200. In the logical model 200, the middle three stages form a Clos network. The first and last stages, the sorters 215, 225, allow switching across a subset of the routers 216, 226. The routers 216, 226 are the ingress and egress stages of the logical 3-stage Clos network.

Set forth below is the relationship between the physical Clos network 100 and the logical model 200 of the switch element.

A model for a physical ingress switch 110 is formed by decomposing the physical ingress switch into a logical ingress device 210 comprising multiple routers 216 interconnected to one or more sorters 215, as shown in FIG. 2. Likewise, a model for a physical egress switch 130 is formed by decomposing the physical egress switch into a logical egress device 220 comprising multiple routers 226 interconnected to one or more sorters 225, as shown in FIG. 2. In one implementation, a sorter 215, 225 is responsible for selecting a time slot, and a router 216, 226 is responsible for selecting a center stage device 230 to which the time slot is to be switched or from which the time slot is to be received.

A physical center stage switch 120 is modeled as a logical center stage device 230 by expanding the number of edges and reducing the number of time slots per edge. For example, if a physical center stage switch 120 has 32 physical edges and 16 time slots per edge, then the logical center stage device 230 would have 32×16 or 512 edges with one time slot per edge. Thus, the logical center stage device 230 is able to accommodate the same aggregate bandwidth as the physical center stage switch 120, but just uses a flattened index by converting the indices of the multidimensional array to an index of a single dimensional array. In one implementation, each router 216, 226 is connected to an edge of each logical center stage device 230. This means that the size of each router 216, 226 is equal to the number of logical center stage devices 230. Thus, if there are K center stage devices 230, then each router 216, 226 has a size of K (i.e., can send or receive K time slots at a time). In one implementation, the size of each router 216, 226 is 24×24 to support 24 center stage devices 230.

The model 200 shown includes 24 center switches. Though the number of center stage switches 24 is selected to achieve certain optimizations, other numbers may be used. The input sorter 215 (and output sorter 225) is partitioned so that no connection may cross a partition line (i.e. lines from a sorter are statically mapped to routers). So, as in the example shown where there are 24 center switches, each router is sized to be 24×24. Therefore every line gets exclusive use of the router(s) that it maps to. For instance, any port on an eight-port line module maps to exactly 2 routers. Similarly, an OC 192 port maps to 8 routers. On a sixteen-port line module, each port maps to one router. The partition lines in the sorter 215, 225 are not between all routers, just at the boundary between lines.

One of the properties relating to this model of the switch is that protection operations for protection applications can all be done in the active bank. Examples of protection applications include APS, VLSR, TLSR, and UPSR; however, it is possible for one skilled in the art to apply the teachings disclosed herein to other protection types. Furthermore, the actions for achieving these operations are independent of the control algorithm and supported by the model alone. Protection switching events can occur very quickly for two reasons, because no control algorithm needs to be run and, since the operations are performed in the active bank, there is no need for a central control to commit the changes to the switch fabric thus further reducing protection-switching times. Another more subtle improvement with this method is that line-based protection events are not implemented with connection-based manipulations.

A model such as that described above is an isomorphism of the physical switch element 100. Descriptions provided in this application may incorporate aspects of this model, but other models may also be implemented and contemplated in different embodiments of the invention, using similar principles disclosed herein.

This model enables many benefits to be realized. As will be described in greater detail below, the model enables faster response to switching events to be achieved. In addition, it realizes this benefit without needing over-provisioned bandwidth. Over provisioned bandwidth is the bandwidth over and above the needed bandwidth to support point-to-point connections. One example of over provisioned bandwidth in a 3 stage Clos architecture is input copy multicast.

C. Switch Configuration

This section further describes the logical model of the switch element, according to an embodiment of the invention.

FIG. 2 illustrates a logical model 200 of a switch element 100. Switch element 100 includes a set of ingress devices 210, a set of center stage devices 230, and a set of egress devices 220. As was described above, the logical model 200 provides that the components of switch element 100 can be separated into 5-stages. The 5-stages include input sorters 215, ingress routers 216, center stage devices 230, egress routers 226, and output sorters 225. This logical model can be mapped back to a physical switch element (such as the Clos network shown in FIG. 1) to implement a switch element capable of performing fast reconfigurations. Software or other logic can be used to implement the logical model on the components of a physical switch element.

Ingress device 210 includes at least one input sorter 215 and ingress router 216. Egress device 220 includes at least one output sorter 225 and egress router 226. A plurality of ingress data lines (not shown) couple to input sorters 215 of ingress devices 210. A plurality of egress data lines (not shown) couple to output sorters 225 of egress devices 220. Input framers (not shown) frame communications from the ingress data lines to input sorters 215. The communications framed by the input framers provide the bandwidth (i.e. time slots) to ingress device 210. Output framers (not shown) frame communications from output sorters 225 to the egress data lines. The communications framed by the output framers provide the bandwidth to the egress data lines.

In one implementation, each ingress router 216 receives data from only one ingress data line. Likewise, each egress router 226 forwards data to only one egress data line. One or more ingress routers 216 may receive data from the same ingress line, and one or more egress routers 226 may forward data to the same egress line, but each ingress or egress router may receive or forward data to only a single data line. This restriction gives rise, at least partially, to the ability to respond to switching events more quickly.

In order to assign routers 216, 226 to each data line, corresponding input and output sorters 215, 225 are partitioned. When partitioned, any unit of bandwidth from an ingress or egress line may be connected through the corresponding input or output sorter 215, 225 to only those routers 216, 226 assigned to that line.

On the ingress side, the number of bandwidth units that each ingress data line carries is received by one of the input sorters 215. The input sorter 215 selects one or more routers 216 for each ingress data line (each data line has one or more routers dedicated thereto). The bandwidth units are distributed to the selected ingress routers 216. Each selected ingress router 216 is coupled to each center stage device 230. As such, the size of each ingress router 216 (i.e. the amount of bandwidth that can pass through it at one time) is equal to the number K of center stage devices 230. Thus, each router can output K units of bandwidth, one to each center stage device 230.

On the egress side, the size of each egress router 226 is equal to the number of center stage devices 230 in use. Each egress router 226 is assigned only one egress data line. In addition, egress router 226 may receive a unit of bandwidth from each one of the center stage devices 230. Each egress router 226 receives from the center stage devices 230 a total amount of bandwidth that is equal to the number K of center stage devices 230. More than one egress router 226 may supply bandwidth to a particular egress data line, but each egress router 226 is assigned to only one egress data line. As with the ingress side, the output sorter 225 selects one or more routers 226 for each egress data line.

The sorter 215 partitions time slots to the routers 216 in accordance with the symmetrical structure set forth above. A detailed description of the partitioning process is provided in copending and commonly owned U.S. Patent Application entitled "Switching Control Mechanism Based Upon The Logical Partitioning of a Switch Element" to Jeff Gullickson et. al. and filed Oct. 29, 2001, and assigned Ser. No. 10/020,014, the contents of which are expressly incorporated herein by reference.

Given the model 200, switch element 100 can be partially configured at initialization using a conventional control or arrangement algorithm. However, portions of the connections are not initialized using the control algorithms. These portions are initialized using a post-processing (i.e., post rearrangement processing) method that is discussed in greater detail below.

D. Initialization: Modeling and Connection Processing

Figure 3A:
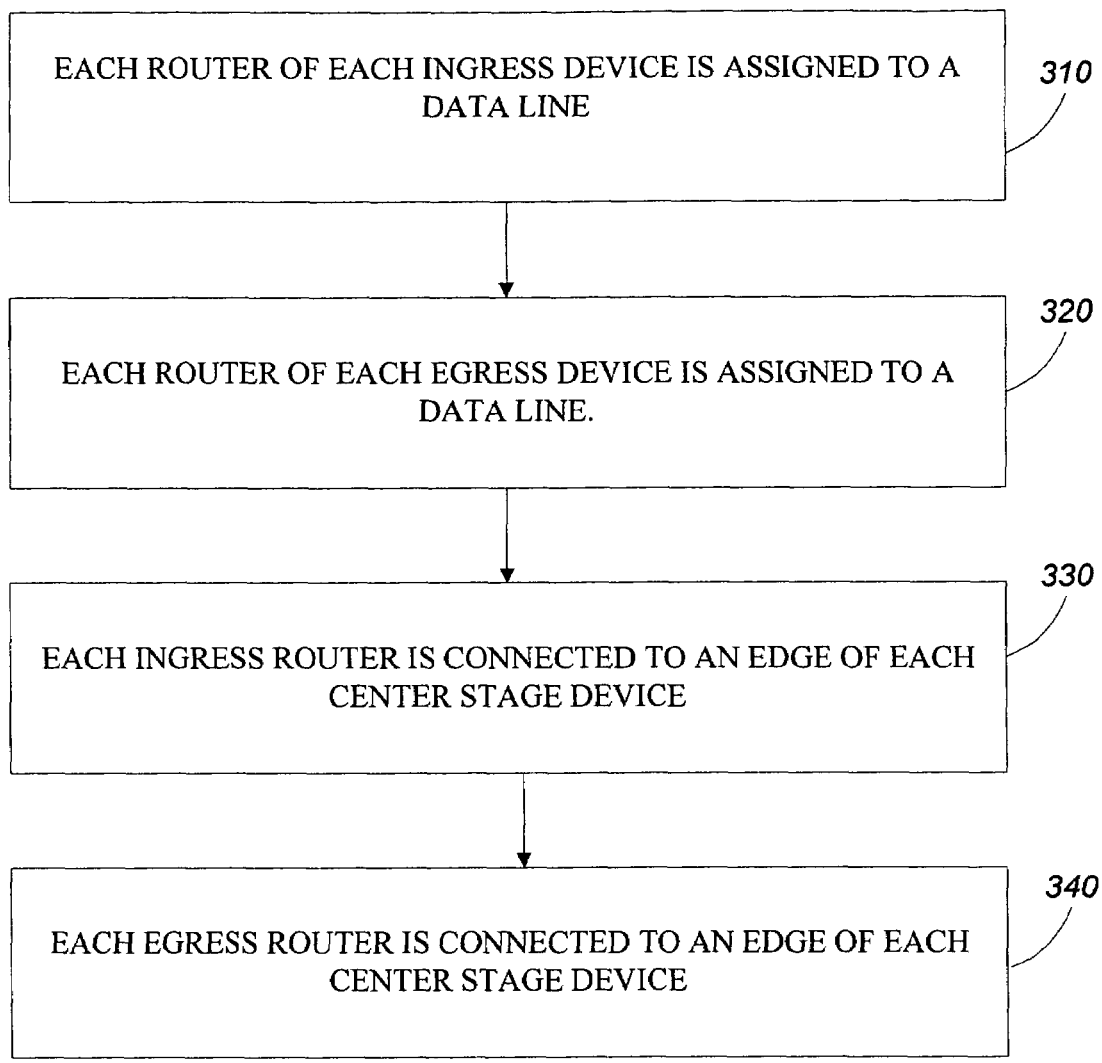
FIG. 3a is a method for structuring a switch element to conform to the logical model of FIG. 2.
Figure 3B:
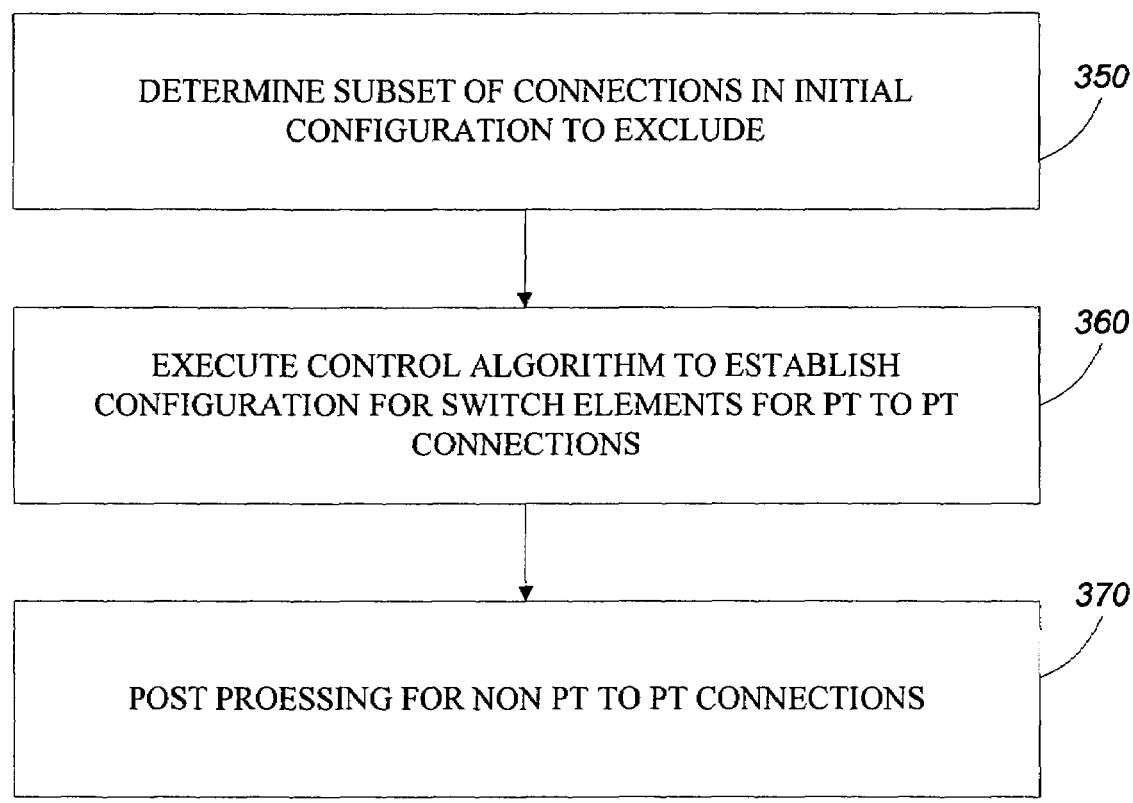
Figure 4:
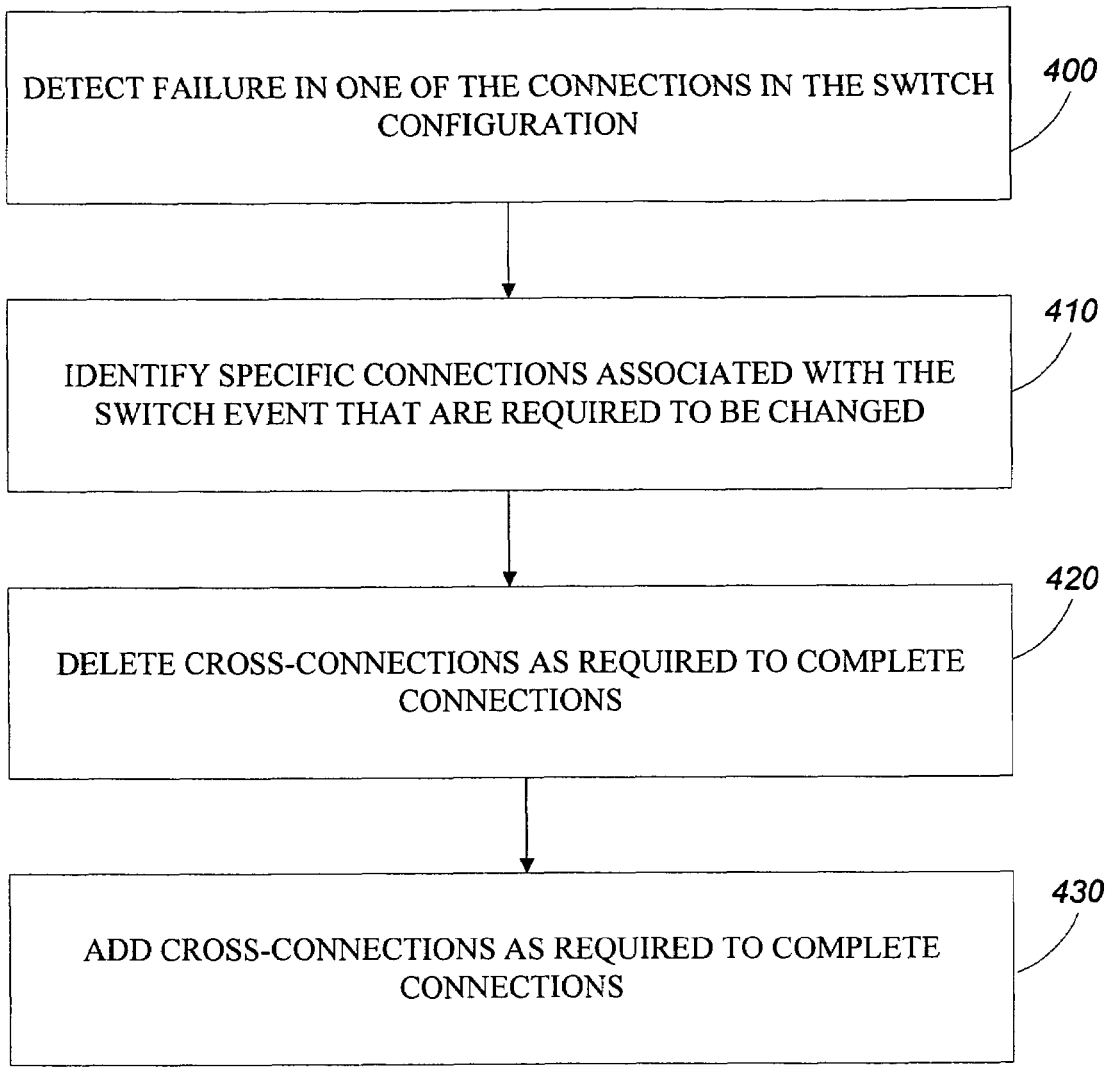
FIG. 4 is a method for performing a fast rearrangement on a switch element having existing connections.

FIG. 3a shows a method for modeling a switch element 200. FIG. 3b shows a method for initializing the switch element 200 to support a desired set of connections. The method for initializing includes the creation of portions of the connections using conventional rearrangement algorithms and the remaining portions in a post-rearrangement process. The description of which portions are configured by which processes is described in greater detail below. FIG. 4 shows a method for performing a fast rearrangement on a modeled switch element 200 in response to a switching event. Switching events and the responses thereto are described in greater detail in the next section of this text. References to numerals of FIGS. 1b and 2 are intended to show exemplary components for implementing the methods.

With reference to FIG. 3a, steps 310-340 describe the construction of the logical model of the switch element 200. In step 310, each router 216 of each ingress device 210 is assigned to a data line. More than one router 216 may be assigned to each data line, but each router 216 may be assigned to no more than one data line.

In step 320, each router 226 of each egress device 220 is assigned to a data line. More than one router 226 may be assigned to each data line, but each router 226 may be assigned to no more than one data line.

In step 330, each router 216 is connected to an edge of each center stage device 230. Since the size of each router 216 is equal to the number of center stage devices 230, each router 216 will have one connection to each center stage device 230.

In step 340, each router 226 is connected to an edge of each center stage device 230. Since the size of each router 226 is equal to the number of center stage devices 230, each router 226 will have one connection to each center stage device 230. As a result of steps 310-340, the logical model is established and ready to use.

In FIG. 3b, a method is illustrated for initializing connections on a modeled switch element 200. In step 350, a subset of the connections required for the initial configuration is identified. In one implementation, a portion of the switching element is designated to have no connections at the time for running the rearrangement algorithm. This identified portion depends on the protocols supported, and in one implementation (i.e., 1+1 APS), the portion corresponds to all connections that are associated with routers for a protection line. Methods for deciding which connections should be excluded from consideration when running the rearrangement algorithms are discussed in greater detail below. Configuration information for connections excluded from the rearrangement algorithm is stored in data structures for use in a post-processing step. All excluded connections, and in particular for the given example connections to the protection routers, are initialized in a post-processing step set forth below. In step 360, a control algorithm is executed to establish an initial configuration for the ingress and egress devices of the switch element 200 for each of the identified connections not present in the subset (i.e., the point to point connections for the working paths). More particularly, the configured switch element 200 establishes a plurality of connections that connect ingress data lines with egress data lines, including setting up the cross connects in the routers 216, 226 and center switch 230 to support the desired connections. In step 370, the remaining connections (i.e., the non-point to point connections required for the initial configuration) are initialized in a post-processing step. More particularly, connections for bridges, selects and pass-through configurations are created depending on the initial configuration desired for the switch element. The creation of the remaining connections includes the creation of the cross connects in the respective routers and center switches to support the desired connections.

In one implementation and with reference to the switch control module of FIG. 1b, at step 360, the logical switch controller 191 receives connection requests including point-to-point and point-to-multipoint connections. The logical switch controller 191 stores the point-to-multipoint connection information in a table and presents all connections to a sorter manager 192 as point-to-point connections. Examples of tables used to store point to multipoint connection data include UPSR tables and APS 1+1 tables. Note that the table may be either interface (line) based or connection (path) based. The sorter manager 192 writes an O/I map (output to input map) for all unidirectional connections. The logical switch controller 191 thereafter directs the switch control algorithm 193 to scan the O/I map and run a control algorithm (i.e., Paull's Algorithm) to assign center stage switches to each valid, unassigned point-to-point connection in the O/I Map. The logical switch controller 191 creates the cross connect data for the point to point connections from the center switch data calculated by the switch control algorithm 193. During post processing, the logical switch controller 191 adds the cross connect data for the point-to-multipoint connections based on the type of point-to-multipoint connection request received by the logical switch controller 191. An example of a point-to-multipoint connection request is an APS 1+1 connection or a UPSR bridge and select connection, although many other examples exist. The logical switch controller 191 then forwards the cross connect data including point-to-point connections and point-to-multipoint connections to the program controller 195. The program controller 195 programs the switch element and maintains the cross connect data for subsequent use in switching event processing.

E. Operational Mode: Reaction to Switching Event

Referring now to FIG. 4, in step 400, a switching event is detected that affects at least one of the connections across the switch element 200. The switching event may be detected by components of switch element 200. For example, framers may be used to detect line failures.

In steps 410-430, a fast rearrangement is performed that rearranges only part of the existing connections across the switch element 200. More specifically, the specific connections associated with the switch event that are required to be changed are identified (410). Connection data supporting the rearrangements are stored prior to a switching event Examples of connection data include UPSR tables, APS 1+1 associations, APS 1:1 associations, VLSR protection groups, and TLSR protection groups although many additional examples exist. As part of the initialization process, protection applications may configure switch element interfaces as part of a protection group. Examples include APS 1+1 associations, VLSR protection groups and TLSR protection groups. Connection data required for switching event processing may also arrive from the logical switch controller 191. Examples include UPSR bridge and select connections, although additional examples exist. Furthermore, protection applications may periodically update the connection data for connections to be added during a switching event. Examples include VLSR and TLSR pass through connection data, although others may exist. It is also possible for one skilled in the art to create other mechanisms by which connection data required for switching event processing may be stored such that the switching event may be processed without running a rearrangement algorithm (i.e. Paull's Algorithm).

Accordingly, a protection application may command the Program Controller 195 to update the active bank to reconfigure the switch elements in response to the detection of a switching event. Examples of protection applications include APS, VLSR, TLSR, and UPSR although many others exist. Only one, or a select few, of the center stage devices 230 used to connect ingress lines to egress lines may be affected in the rearrangement. The connections that are rearranged are only those affected by the switching event. Information describing the connections is stored in the memory bank. Connections are deleted (step 420) and added (step 430) in accordance with the reconfiguration requirements for a given switch event.

According to an embodiment, fast rearrangements are accomplished by deleting old connections (as required, though in some configurations the old connections are maintained to speed the reconfiguration process) and by making new connections using one of three primitive operations. The three primitive operations may be performed from affected center stage devices 130. The three primitive operations are select, bridge and pass-through. According to embodiments of the invention, these primitive operations can be performed independently of one another, from the center stage devices of switch element 200.

In an embodiment, each of the bridge and select primitive operations can be implemented using router configurations. Any router may mimic the configuration of any other router, regardless of whether the router is used on ingress devices 210 or egress devices 220. A configuration is data that determines how the router's outputs are connected to the router's inputs. Since every router 216, 226 is connected to every center stage device 230, any traffic that was supported on one router may move to another identically configured router and still support that traffic.

The select primitive alters the source of a connection to one of the center stage devices 230 at the ingress side. A select is performed by copying the configuration of one ingress router 216 to another ingress router 216. Then, the center stage device 230 is reconfigured to accept the new router 216 as the input for the connections that the old router supported. An egress-select is an operation that may be performed symmetrically on the egress side of one or more center stage devices 230.

Another primitive operation is bridging. Bridging causes two or more egress lines to receive the same data. One egress router 226 on the egress side is designated as the parent. One or more other egress routers 226 are designated as children of the parent router 226. Note that the parent router limitation is only a requirement to the arrangement algorithm (i.e. Paull's matrix). The connection may be requested via either the parent or the child router (this can be used to specify the default selector). Internally, the hardware or software presents the connection to the rearrangement algorithm over the parent router only and then updates the router setting during post processing. Connections via the re-arrangement algorithms are only placed on the parent router 226. This is guaranteed to work because the routers only support one line. Each child router 226 is given the configuration of the parent router 226 in post processing. Each center stage device 230 has the capability to bridge (multicast). The output of each center stage device 230 destined to the parent router 226 is copied to all the child routers 226. In this manner each child router 226 outputs the same data as the parent router 226, thus effecting bridging. Selecting and bridging at the line level is accomplished by selecting and bridging using a plurality of routers. Selecting and bridging at the path level is accomplished by selecting and bridging using a portion of a plurality of routers.

Pass-throughs are the final primitive operation. Just as the name suggests, pass-throughs are connections that allow data to pass through a respective switch element without data drops or additions. Pass-through connections are created using available bandwidth within a given switch element. Pass-throughs can be created at the time of a failure to reroute data along a protection path between source and destination nodes in a network. The creation of pass-throughs and the location of available bandwidth within a given switch element is discussed in greater detail below.

The fast re-arrangement mechanism described above is in contrast to other conventional methods, where control algorithms need to be executed to perform the rearrangements. In such conventional systems, the control algorithm establishes the configuration for the switch element, which can introduce substantial delays into the switch element's operations. When a switching event occurs, the control algorithm is executed again to rearrange the switch element to compensate for the event. This inefficient conventional technique usually involves determining new paths for all network connections across all stages of switching.

An embodiment, such as described in FIGS. 3a and 3b, however, can maintain most of the network connections across the switching element 200 even after a switching event has occurred. This efficient fast rearrangement is achieved by avoiding the need to reconfigure all of the logical center stage switching devices 230 as well as corresponding ingress or egress devices 210, 220. Rather, this embodiment rearranges only select parts of the logical center stage devices 230 in response to the switching event. The rearrangements may provide for either selecting the center stage switching device 230 to receive communications from a new ingress stage switching device 210, bridging/multi-casting communications on the logical center stage switching device from one egress stage switching device 220 to one or more other egress stage switching devices 220 or passing through connections using the available bandwidth in the center stage switching device 230.

F. Implementations of Protect Lines and Working Lines

Embodiments of the invention may be used to implement working lines and protect lines across a switch element, such as described with FIG. 2. The working lines may be interconnected with one another in the absence of failures. When line or connection failure occurs, one or more protect lines may be used to enable data to be switched across the switching element. In these instances, embodiments of the invention rearrange switching elements to interconnect protect lines for failed working lines.

An important consideration for the use of protect lines is to make the switch from working line to protect line transparent to an end user or device. This requires the transfer from working line to protect line to be sufficiently fast so as to limit data loss. In current applications, it is desirable for the switch from the working line to the protect line to be accomplished in approximately less than 60 ms. A protect line interface may support extra traffic while the working line does not require the protection provided by the protect line. Examples include 1:N APS, four fiber VLSR, and TLSR. When required, the extra traffic carried by the protect line will be dropped and the protect line will be used to protect the failed or degraded working line. When traffic may be restored to the work line, and the protect line is no longer required by a bridge, select, or pass through primitive, the protect line will again be used for extra traffic. These operations are all completed by the fast rearrangement mechanism.

1. APS

One application of protect lines is Automatic Protection Switching ("APS"). In APS, network connections are associated with a working line or protect line. In 1+1 APS a switch element continuously bridges one protect line for each working line. In 1:N APS, a switch element 200 bridges at time of failure and assigns one protect line for every N working lines. In these configurations, a switching event typically is a failure of one of the working lines. These APS configurations require that the switch element 200 perform a fast rearrangement in order to switch the failed working line over to the protect line.

In an 1+1 APS group, connections are continuously bridged to both the working and protect lines. The bridging action is achieved by using a center stage copy as described below. More particularly, an association between the working and protect lines is created for the group. This creates a one to one association between the routers on the working line and the routers on the protect line for a given group. The connections associated with the protection line form the subset of connections that are not to be processed by the control algorithm (step 350 of FIG. 3b). Connections are provided into the control algorithm for the working line only (step 360 of FIG. 3b). The protect line's routers are empty during the control algorithm. The reason for keeping the protection lines routers empty is that APS 1+1 does not support extra traffic on the protect line.

After the control algorithm has created the appropriate cross connections to create the desired initial subset of connections, a post-processing step is invoked (step 370 of FIG. 3b). More particularly, the output routers for the protect line are configured identically as the working line and then a copy operation is performed at the center stage for the timeslots to the protect output router. The system can perform the copy operation without affecting any other connections in the center stage because the center stage switch chips are strictly non-blocking for arbitrary multicast. Since every output router has exactly one connection to each center switch, the copy can always be achieved because the working and protect routers are symmetrically connected and the routers serve no other lines. FIG. 3c illustrates this. The selector function is symmetrical to the bridging function. Just as for the bridging direction, the protect router on the ingress side will be identically configured to the working routers. When the selector needs to change (i.e. at the time of a switching event), the center switch cross connects are modified in the active bank to point to the protect line instead.

Figure 6A:
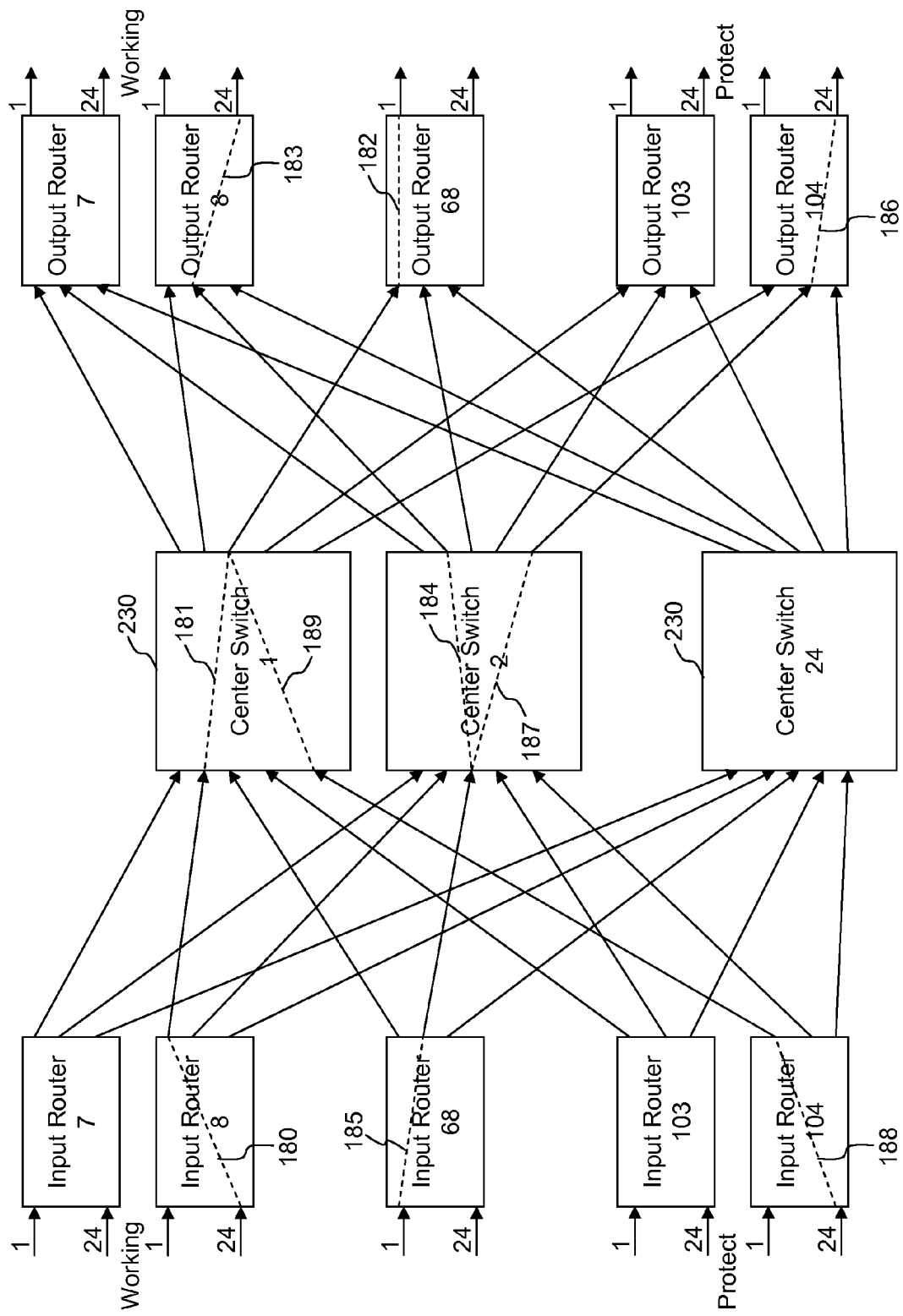
FIG. 6a illustrates a method for performing a switchover from a working line to a protect line in a switch element configured to support APS 1+1.

In the example shown in FIG. 6a, there is a connection from Router 68 to Router 8. Routers 7 and 8 are associated with the working line and routers 103 and 104 are associated with the protect line. The control algorithm is run to add a connection, in both directions, between Router 68 and Router 8 (step 360 of FIG. 3b). The connection produces cross connects 180-185. To achieve bridging, the post-processing step of FIG. 3b is performed. More specifically, the cross-connect on Output Router 104 is created symmetrically to that on Output Router 8 (adding cross connection 186), and then at the center switch, the connection is bridged (adding cross connection 187 in the center switch). For the selector function, a cross-connect is created and maintained on Input Router 104 (cross connect 188), symmetrically to the cross-connect on Input Router 8. This implies that data from the protect line will terminate at the center switch. This enables an easy and quick switchover, where only the cross-connect on the center switch (cross connect 189) needs to be modified to perform the select function.

Reconfiguration in a system configured to support 1:N APS is very similar to 1+1 APS. A switch element configured to support 1:N APS includes protect lines that may carry extra traffic. However, upon a failure of an associated working line, a given protect line will drop any extra traffic on the interface and yield all it's time slots. Thus, the protect line's routers will be empty when the bridge and select actions described above with respect to reconfiguring a switch element supporting 1+1 APS need to be performed. Once the protect line's routers are cleared all operations are identical to the 1+1 APS case.

2. VLSR (Virtual Line Switched Ring) Span and Ring Switches

From the perspective of switch control VLSR Span switches and VLSR Switching Node Ring switches are identical to the switch elements configured to support a 1:1 APS protocol.

3. VLSR Pass-Through

Elements configured to support a VLSR pass-through protocol operate slightly differently with respect to switch control. When a ring failure occurs, all nodes (i.e., switch elements that constitute an add/drop point on the ring) not adjacent to the failure transition to full pass-through. The nodes adjacent to the failure perform a switching node ring switch as previously described. To a device's switch control mechanisms, this means that all traffic on a given set of protect lines (i.e., the two protect lines) is dropped and the protect lines are cross-connected together. No time slot interchange is needed. All lines in a given VLSR protection group are the same size and, during pass-through, extra traffic is not supported. Since the protect lines are the same size, they both use the same number of routers. It is possible for one skilled in the art to create a specialized VLSR or BLSR implementation such that the number and size of the protect line(s) does not match the number and size of the work line(s). Examples include four OC-48 lines providing protection for an OC-192 line or an OC-192 line providing protection for multiple OC-48 lines; however, many other examples exist. The concepts taught herein may be applied to those architectures.

To configure the switching element in any of the nodes of a given ring, the initialization process discussed above with respect to FIGS. 3*a* and 3*b* is invoked for traffic on the east and west protect lines as well as for extra traffic on the east and west protect lines.

Figure 6B:
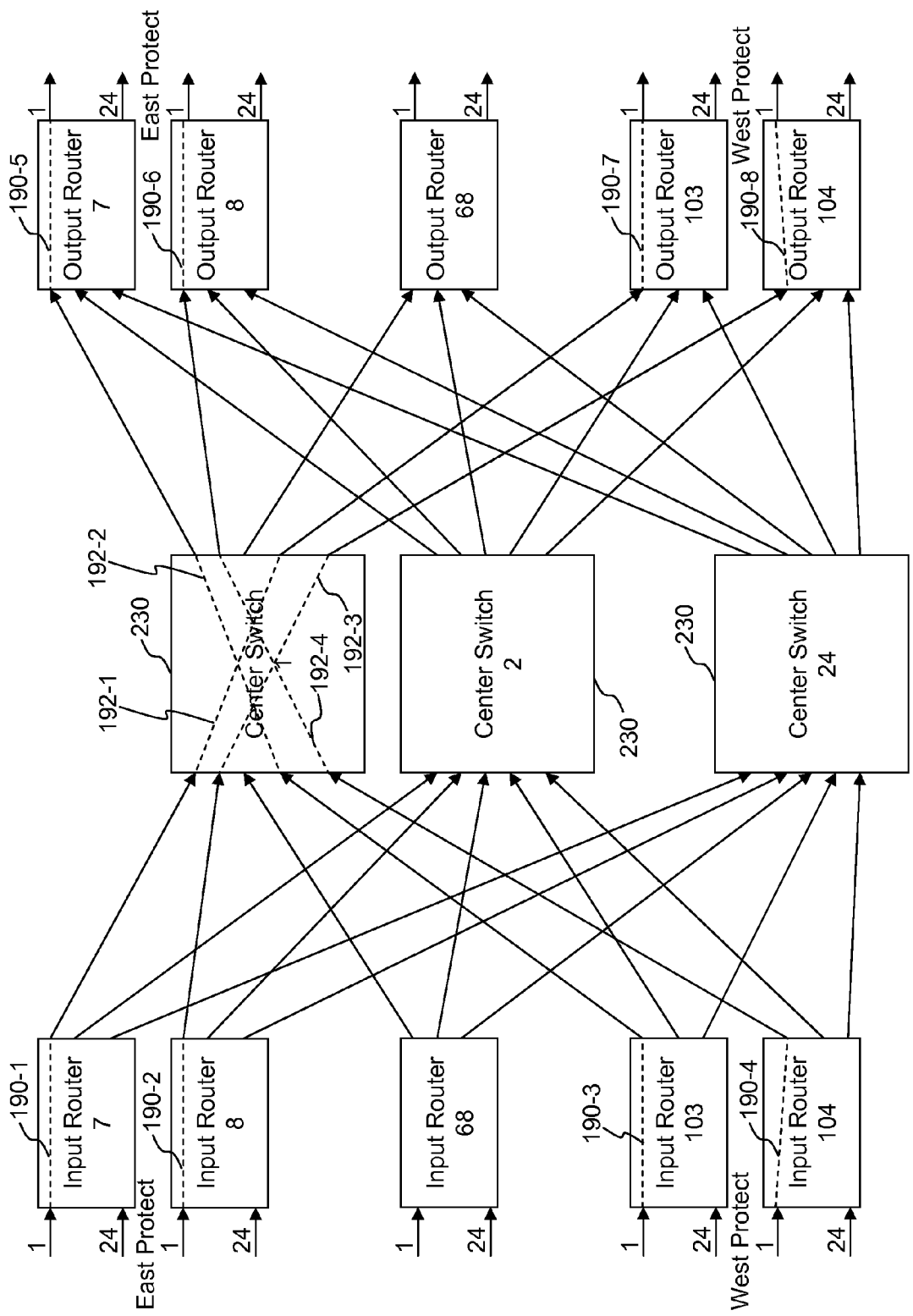

During ring switch processing at an intermediate VLSR node, the protect routers may contain extra traffic when the process begins. If present, the extra traffic is dropped and the router yields all its timeslots to the pass through operation. In reference to FIGS. 4 and 6*b*, all the routers for the east and west protect lines are configured to pass-through the timeslots directly as part of the fast rearrangement process. During processing (step 430), the first ingress router of the west protect line is connected to the first egress router of the east protect line (creating cross connects 192-1 through 192-4). Since each router has a single edge to each center switch there is only one way this can be done. The remaining protection routers are connected in a similar fashion. Notice that at most two line modules (LM's) are involved in this operation, the ones that contain the protect lines. FIG. 6*b* shows the connections (i.e., STS1's) that pass through the first timeslots of each router in the pass-through mode. All others are symmetrical.

4. TLSR (Trans-Oceanic Line Switched Ring)

From the point of view of switch control, TLSR's are the same as VLSR's except they need a special type of pass-through connection. When systems are configured to support TLSR, in some cases when a node goes into full pass-through it will drop some of the pass-through connections. Since bridging is desired to minimize the revert switch time, a conventional switch control method cannot be applied.

However, the protect line routers provide at least as much capacity as the working line routers and all connections to be dropped originally came from a working line in the same ring. These two conditions ensure that there are enough edges to support the connection as is. That is, the egress to center and ingress to center cross connects to the drop port are maintained after the switch event (failure of the working line).

Figure 6C:
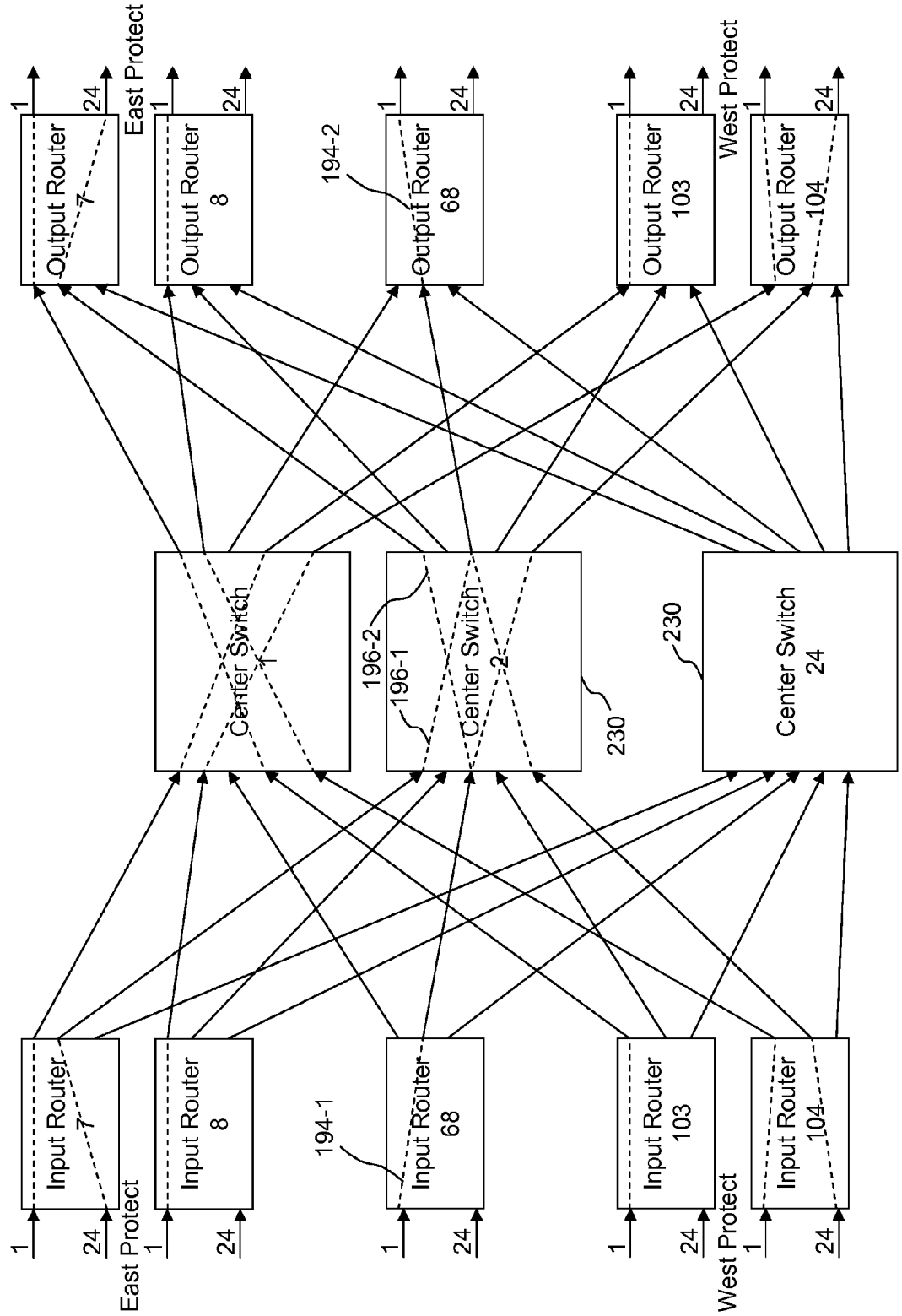
FIG. 6c illustrates a method for performing a switchover in response to a switch event in a switch element configured to support TLSR.

FIG. 6*c* illustrates an STS1 connection that is dropped instead of being passed through for a switching element in a ring that is configured to support TLSR. In this example an STS1 was going from the west working port (not shown) to the drop port. After the ring failure, the east protect port will support the connection. The timeslot need not be the same as the one used on the west working port. VLSR's unlike BLSR's allow timeslot interchange as a connection traverses a ring. State machine's in the switch element accommodate the interchange and only are required to know which timeslots to drop. Cross connects 194-1 and 194-2 represent that portion of the original cross connect that was not torn down. The system maintains these cross connects so that the rearrangement algorithm doesn't need to be run. Cross connects 196-1 through 196-2 are used to drop the connection. The east and west routers is used symmetrically to support this configuration. This implies that the system could drop & continue this connection, if desirable. After all drop connections have been routed, then all pass-through connections are routed just as in the VLSR case. The only difference is that time slot interchange will need to occur to jump over those edges used by the drop connections. This will be symmetrically in all routers involved. Deciding where pass-through connections can be added is discussed in greater detail below.

Figure 6D:
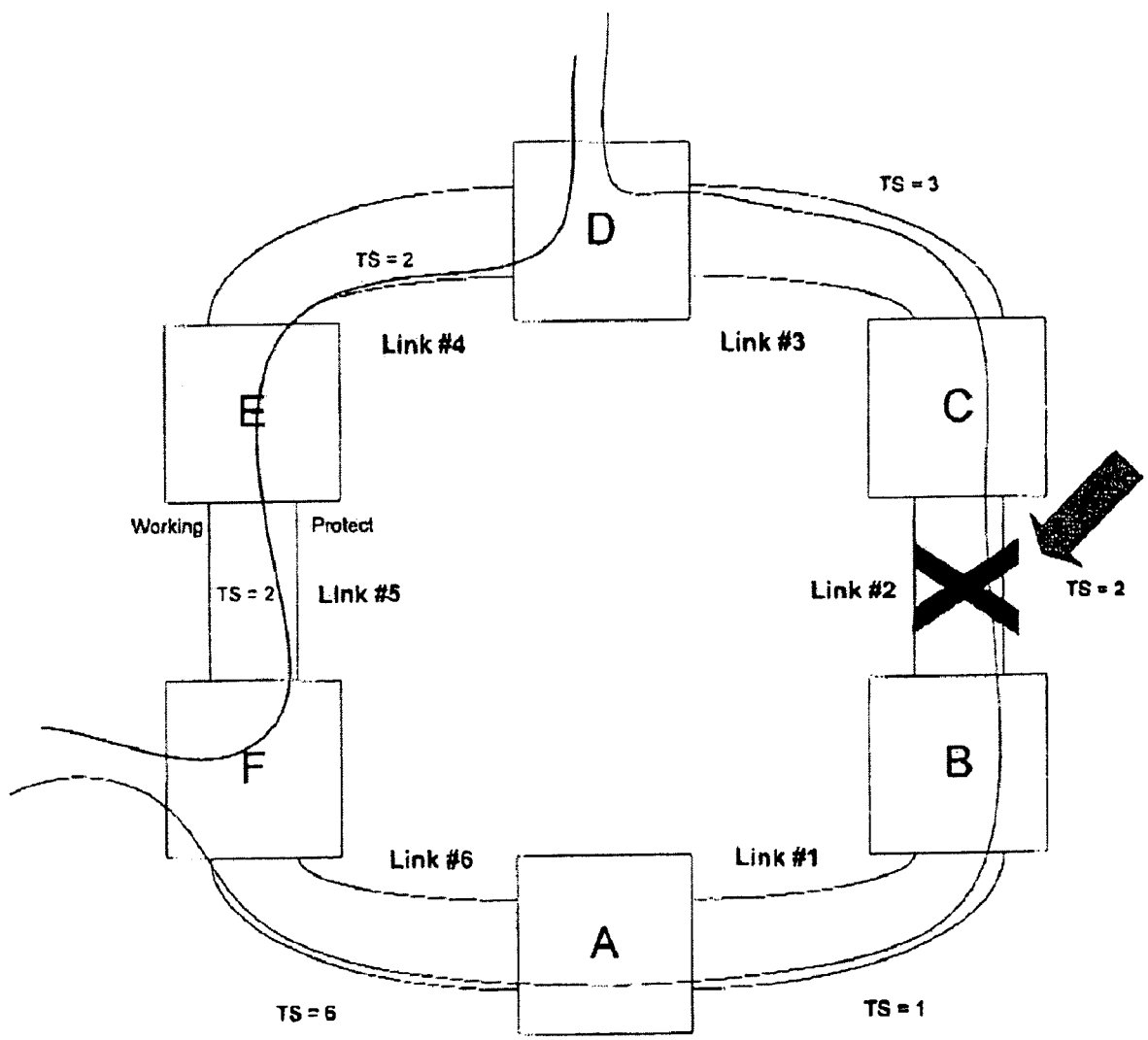
FIG. 6d shows a network configured to support TLSR that includes a failed link.

As discussed above, generic line level pass-through is required to support TLSR. This can be seen more clearly from the example shown in FIG. 6*d*. A connection is initially established between nodes F and D, that includes pass-through connections in nodes A, B and C along the path from node D to F (in a counter clockwise direction). After a failure is detected between nodes B and C, a new pass through connection is required in node E along with a drop connection in node F for the data that has been redirected along the path from node D to node F that passes through node E (the protection path). The TLSR engine 196 (FIG. 1*b*) keeps track of connections that need to be dropped in case of a ring failure and keeps state for all possible ring failure cases. Then, when the failure occurs and a pass-through command is given, the Program Controller 195 looks up the appropriate path state (that corresponds to this ring failure case) and feeds the appropriate connections to the drop port(s). This requires a lot of states, but it enables the software to perform TLSR pass-through operations very efficiently.

The data structures that contain this state are implemented in a TLSR drop table as shown in FIG. 6*e*. For connections to be dropped from pass-through, we only need to know that the connection is being dropped. It is up to the individual line module to compensate for the fact that the connection will use a different time slot on the protect line versus the local working line. There are a maximum of 16 nodes on a TLSR ring. Hence there are 14 possible line failures that could cause the node to go into pass-through. It is possible to create a ring consisting of more than 16 nodes. The concepts taught herein may be applied to those architectures as well. For each one of these links a local connection (i.e., STS1 connection) on the working port could either be present on that link or not. If the connection is present on link the value TRUE is entered into the TLSR drop table else FALSE is entered. The 14 different link IDs are unique within a ring only. The flattened time slot of the drop side of the connection is needed as well. The exact use will be described below. The time slot could be interpreted as either an ingress sorter input time slot (ISITS) or an egress sorter output time slot (ESOTS). For the purposes of these discussions, the time slot is an input sorter ingress time slot ISITS.

In operation, the TLSR engine 196 needs to know which timeslots on the protect lines are passed through from east to west or west to east, but only the number of such connections. More correctly the TLSR engine 196 only needs to set up as many pass-through connections as the system needs. In one implementation, the TLSR engine will set up as many pass-through connections as possible.

At connection setup, the switch control module will set the TLSR drop table entry corresponding to each locally dropped connection to indicate that the connection would be dropped if a ring failure occurred in that span. When a ring failure occurs, the TLSR drop table is examined for the entry(s) that correspond with the failed span, indicating which connections to drop from pass-through locally. The drop connections are modified first then the pass-through connections are added.

More specifically, this section covers in detail how the bridge, select and pass-through connections are constructed for a node having east and west working and protect ports and associated lines connected thereto. The description is provided to show that bandwidth will be available to make the pass-through connections as required to support any switching event. First some definitions are in order. The following sets (bit vectors) are defined.

TABLE 1

| Set Name | Definition |
| --- | --- |
| Protect East Egress (PEE) | The set of all available inputs to the egress routers of the east protect line. |
| Protect West Egress (PWE) | The set of all available inputs to the egress routers of the west protect line. |
| Protect East Ingress (PEI) | The set of all available outputs of the ingress routers of the east protect line. |
| Protect West Egress (PWI) | The set of all available outputs of the ingress routers of the west protect line. |

A bit set to 1 in any of the given vectors, or TRUE, indicates that the particular input or output is free. At connection setup, all 4 sets are initialized with TRUE, i.e. the protect lines are empty and all inputs and outputs are free. The process breaks down into three steps, bridge, select, and finally pass-through. These steps are described below. The steps will be described for protecting the working east port. The west port is protected in a similar manner. The west and east ports are independent.

A. Bridge Connections to Protect

At the time of failure a command indicating the failed link is received and processed by the Switch Control Module 190. The TLSR drop table is evaluated to determine which add/drop connections are to be bridged and which pass-through connections are to be added. The TLSR drop table is examined for entries having time slots corresponding to connections between the working east port and an add/drop port. To configure the bridge, the Switch Control Module 190 copies the router configuration from the working east port to the protect west port and updates the timeslots for the protect west port from the TLSR drop table. The time slots are derived from the TLSR table using the failed link parameter of the command as an index into the table Using the a link identifier (ID) that identifies the failed link that is provided with the command, the first TRUE entry in the TLSR drop table is located. The time slot T associated with this entry will be dropped from pass-through. For the given time slot T the drop port timeslot, D, is identified. In this example the drop port timeslot is an ISITS.

Using the parent bridge table PBT, the center switch number (CSN) and egress router number (ERN) for the drop port timeslot D is identified. Hereafter, the acronym PERN will be used to refer to the protect ERN, while WERN refers to the working ERN. The router number is then translated to the to the protect west port using the equation, PERN=WERN−WRN+PRN, where WRN, the Working Router Number, is the first router number of the working line and PRN is the first router number of the protect line. In the center cross-connect table CXT, the WIRN, Working Ingress Router Number, is looked up using the working egress router WERN and center switch number CSN. Thereafter, the process writes in the center cross connect table CXT for the center switch number CSN, the protect egress router number PERN the value of the working ingress router number WIRN. In center cross-connect table CXT, the value of next bridge for the working egress router number WERN is transferred to the protect egress router number PERN and the value of next bridge for the working egress router number WERN is set to the protect egress router number PERN. This creates a bridge list, which is needed if the drop port is protected. In the protection the protect west egress PWE vector, at bit index PERN−PRN (or equivalently WERN−WRN), the value is set to FALSE. This input to the router is no longer free. The process is repeated until no more TRUEs are found in the TLSR drop table. At the end of this process protect west egress PWE vector contains all of the free router inputs that the pass-through connections may use.

To establish the bridge for add/drop connections on the west working port, the process can be repeated. These connections will be bridged to the east protecting port.

B. Moving the Selector to the Protect

Not all router outputs of the working line will be selected from the protect line. Moving the selectors can be done in parallel with the bridges or separately. At the time of failure a command indicating the failed link is processed and the TLSR drop table is evaluated to determine which pass-through connections are available. The TLSR drop table is examined for entries having time slots corresponding to the working east port. The time slots are derived from the TLSR table using the link identifier (ID) parameter of the command. Using the a link identifier that identifies the failed link that is provided with the command, the first TRUE entry in the TLSR drop table is located. The time slot T associated with this entry will be dropped from pass-through. Using the parent bridge table PBT, the Center Switch Number (CSN) and Egress Router Number (ERN) for time slot T are identified. The router number, of the selector, to the Protect West port is translated using the equation: PIRN=WIRN−WRN+PRN, where PIRN is the Protect Ingress Router Number, and WIRN is the Working ingress router number IRN. The egress router number is the head of the bridge list.

The process then iterates through the bridge list. And, for all entries, sets the input to the protect ingress router number PIRN. The next bridge field is not modified. This moves the selector.

Thereafter, in the protect west ingress PWI vector, at bit index PIRN−PRN (or equivalently WIRN−WRN), the process sets the value to FALSE. This output of the router is no longer free. The process is repeated until no more TRUEs are found in the TLSR drop table. At the end of this process protect west ingress PWI vector contains all of the free router outputs that the pass-through connections may use.

C. Constructing the Pass-Through Connections

The pass-through connections are typically bidirectional; however, the algorithm does process them as unidirectional connections. The east protect span copies the west working span router configuration and the west protect span copies the east working span router configuration. Since the router configurations may be different, each direction of the bidirectional pass through connection is processed separately using the free outputs left over from the add/drop connection configurations. Using the free outputs defined by protect west ingress PWI vector and the free inputs defined by protect east egress PEE vector, the process can create pass-through cross connects to support pass-through connections flowing from west to east. To create a cross connect, the center switch number of an element of protect west ingress PWI vector matches with the center switch number of another element of the protect east egress PEE vector.

As a proof, let PTWI, be the set of usable outputs for pass-through connections on the west ingress (protect) port and PTEE, be the set of usable inputs for pass-through connections on the east egress (protect) port. In the implementation proposed, PTWI, the set of usable outputs for pass-through connections on the west ingress (protect) port and PTEE, the set of usable inputs for pass-through connections on the east egress (protect) port, are equal and defined by the intersection of the protect west ingress and protect east egress vectors (PTWI=PTEE=PWI∩PEE). Accordingly, in the implementation proposed, the pass-through connections do not need to move from the relative router number. PTWI can be empty, but in all cases PTWI will contain enough elements to support all of the required pass-through connections. Center stage cross connects are created by connecting the same index of PTWI to PTEE, offset by the first router number of the line. The process is repeated for the other direction, i.e. east to west. The same calculations are used to create the ingress and egress cross connects.

5. UPSR (Unidirectional Path Switched Ring)

Figure 7A:
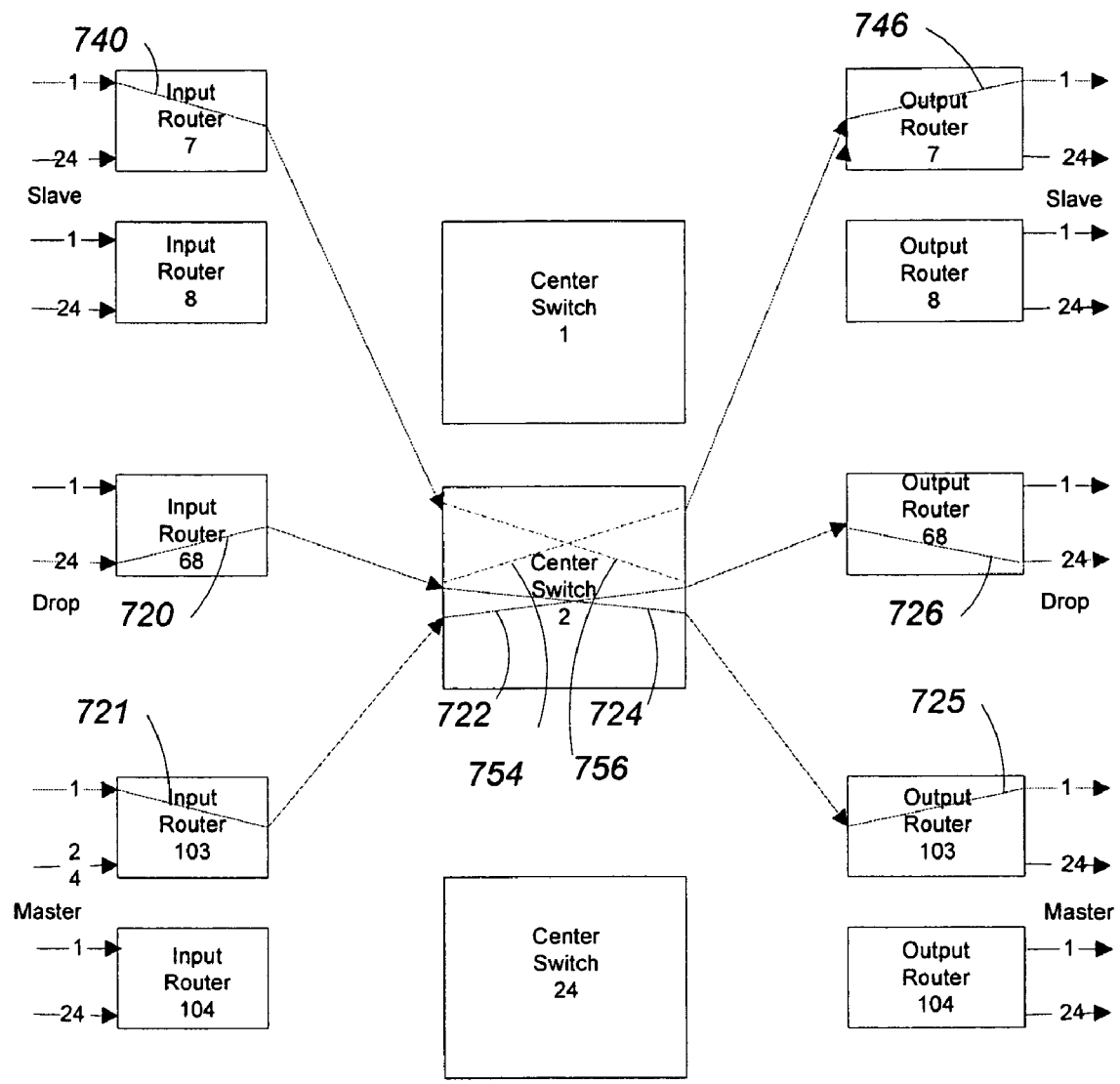
FIG. 7a illustrates a method for performing a switchover in response to a switch event in a switch element configured to support UPSR for a drop connection.
Figure 7B:
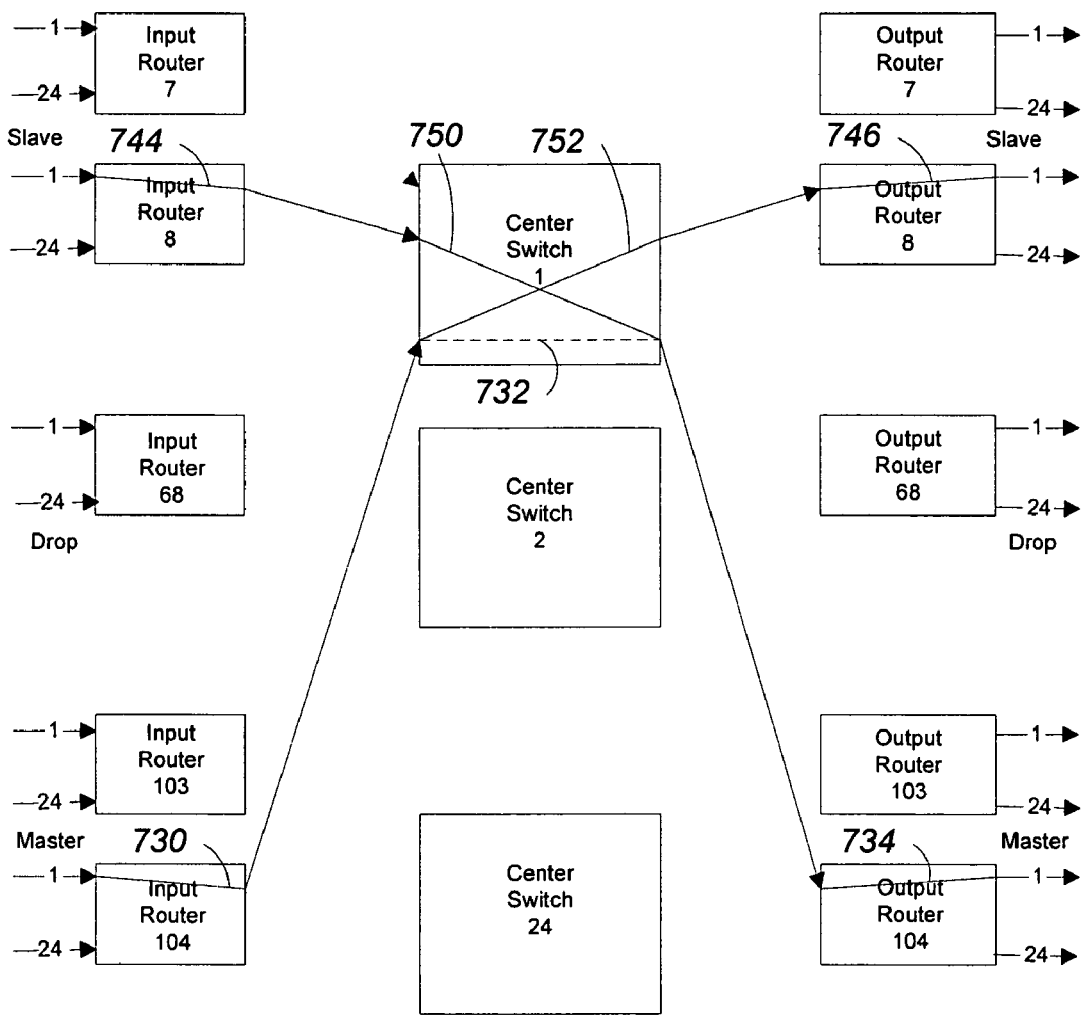
FIG. 7b illustrates a method for performing a switchover in response to a switch event in a switch element configured to support UPSR for a drop connection.
Figure 7C:
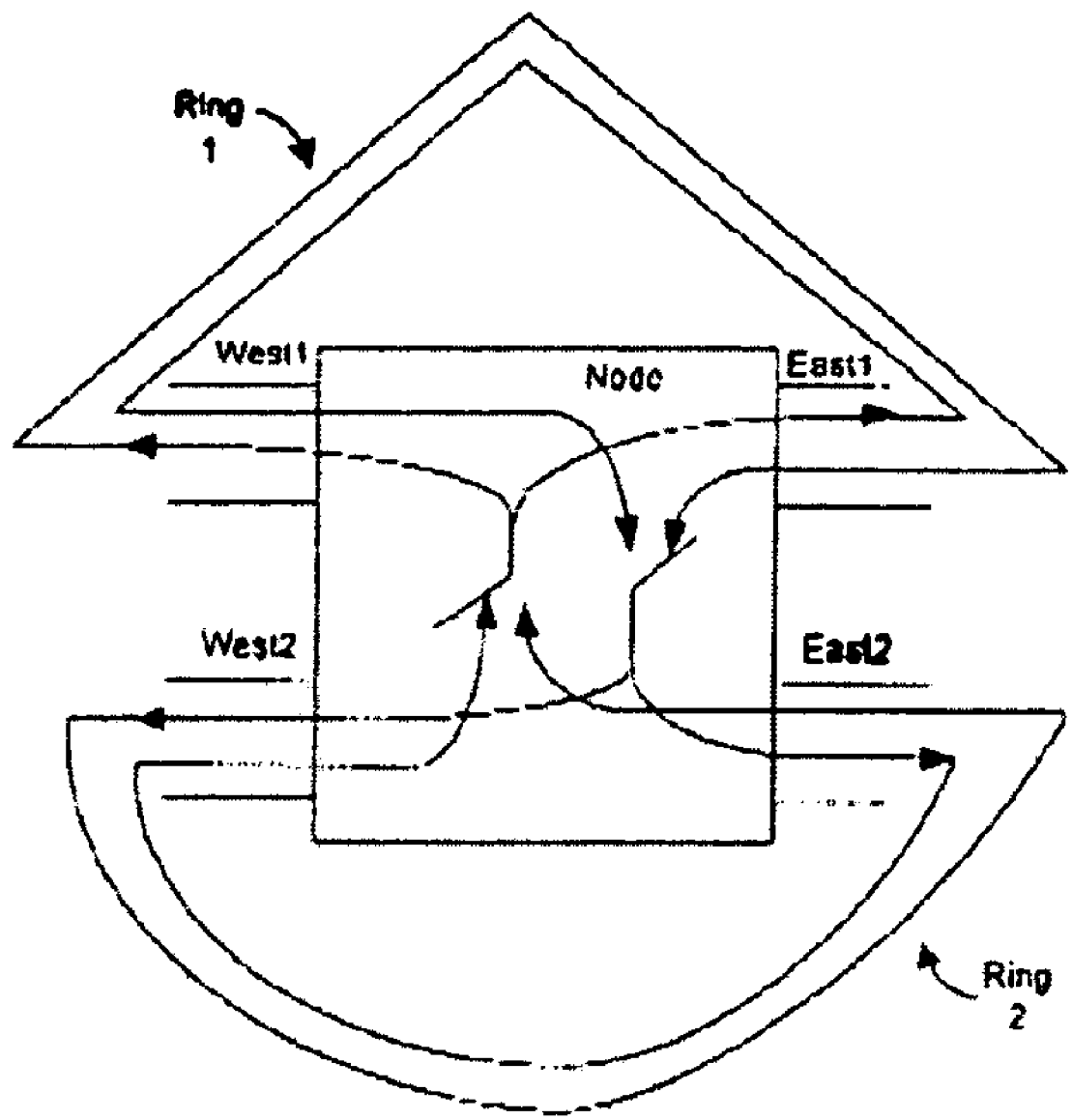
FIG. 7c shows a node in a network configured for UPSR including connections to two rings.

UPSR is another ring protocol that does not require signaling. Data is introduced along both rings in the network by bridging at the ingress node. At the egress node, a select is used to select the data path to be dropped. An example of a node configured for UPSR including connections to two rings of a network is shown in FIG. 7c. As can be seen in the figure, each connection to the east and west port from a ring includes bridge and select portions. The model and methods proposed provide no restrictions on placement of east, west, or drop ports for a given switch element. Nor is there a restriction on how many drop ports a ring may have. Rings may also share drop ports.

UPSR connections require that the East and West ports of the UPSR ring are configured into a master port and a slave port. The rearrangement algorithm calculates the master port router configuration and the configuration is copied to the slave port router configuration. Either of the ports may be master or slave. Referring now to FIGS. 7a and 7b, an example switch element in a UPSR configuration is shown. In this example, a STS1 drop connection is shown in connection with FIG. 7a and a pass-through connection in FIG. 7b. At the time for initialization of connections, (i.e., to add connections to the switch element), the methods described in association with FIGS. 3a and b are invoked. More specifically, the switch element is initially configured in accordance with the logical model shown in FIG. 2 (i.e., by invoking the process of FIG. 3a). Thereafter, specific connections are initialized. An initial subset of connections that are required are identified (step 350 of FIG. 3b). For the add drop connection, a bridge and select connection is identified as between the drop port and a one of the UPSR ports. The Switch Control Module 190 will store the UPSR connection information and present the connection as a point to point connection between the add/drop port and the master port for the UPSR ring. The connection is added to the master port of the UPSR ring regardless of the UPSR port specified in the connection request. The UPSR port specified in the connection request specifies the default selector and is stored in the UPSR table used in the post processing step. For the pass-through connection, a unidirectional path loopback to the master port using the timeslot of interest is identified, while, once again, the slave port is left empty. The loopback connection will later be morphed into a pass-through connection in the post processing step.

After the initial connections are complete, the rearrangement algorithm is run to configure the cross connects in the respective stages (step 360). By way of example, after running the rearrangement algorithm, a completed drop connection is shown in FIG. 7a. The drop connection between the drop port and the master port includes cross connect 720 in the drop port input router 68, connects 722 and 724 in center switch 2, cross connect 726 in output router 68 of the drop port, cross connect 721 in input router 103 of the master port and cross connect 725 in the output router 103 of the master port. By way of example, after running the rearrangement algorithm, a completed unidirectional loopback connection is shown in FIG. 7b. The loopback connection on the master port includes cross connect 730 in input router 104 of the master port, cross connect 732 in center switch 1 and cross connect 734 in output router 104 of the master port.

After the rearrangement algorithm is run, post-processing can be performed to set up the connections to complete the initialization process (step 370 of FIG. 3b) Here, the post processing includes configuring cross connects in the slave port and reconfiguring cross connects in the center switches.

Since the slave port's input and output routers are empty, they can be programmed identically to the corresponding master routers. More specifically, for the drop connection example, cross connect 740 in the input router 7 of the slave port and cross connect 746 in the output router 7 of the slave port are added in post processing. For the loopback connection example, cross connect 744 in input router 8 of the slave port and cross connect 746 in output router 8 of the slave port are added in post processing.

Thereafter, center switch cross connections are added and deleted as appropriate to complete the post processing step. More specifically, for the pass-through connection, the original center stage cross connect 732 in center switch 1 is deleted and replaced with the two cross connects 750 and 752, respectively. This will convert the original loopback connection into a pass-through connection. For the bridge and select connection, center stage cross connects 754 in center switch 2 is added to bridge the traffic to the slave Port.

For the select, the master port is selected by configuring cross connect 722 in center switch 2; the slave port is selected by configuring cross connect 756 in center switch 2. The bridge and select connection is now bridging to both the Master and SlaveWest Ports. The rearrangement algorithm will set the path selector to the master port (connection 722). If the slave port was specified in the original connection request, then the selector will be updated to the slave port (connection 756) by updating the center stage cross connects.

To see that this method imposes no engineering restrictions on the UPSR one needs only to look at the treatment of the slave and drop ports. The slave port routers take on the configuration of their corresponding master port routers. This can be accomplished because in the model implemented above ports do not share routers. Therefore, there is no restriction on the placement of the slave port relative to the master port. The only connection modifications made to the drop port are standard, point-to-point, connection adds and connection deletes. Therefore there are no engineering restrictions associated with the drop port.

G. Hardware Components

Figure 5:
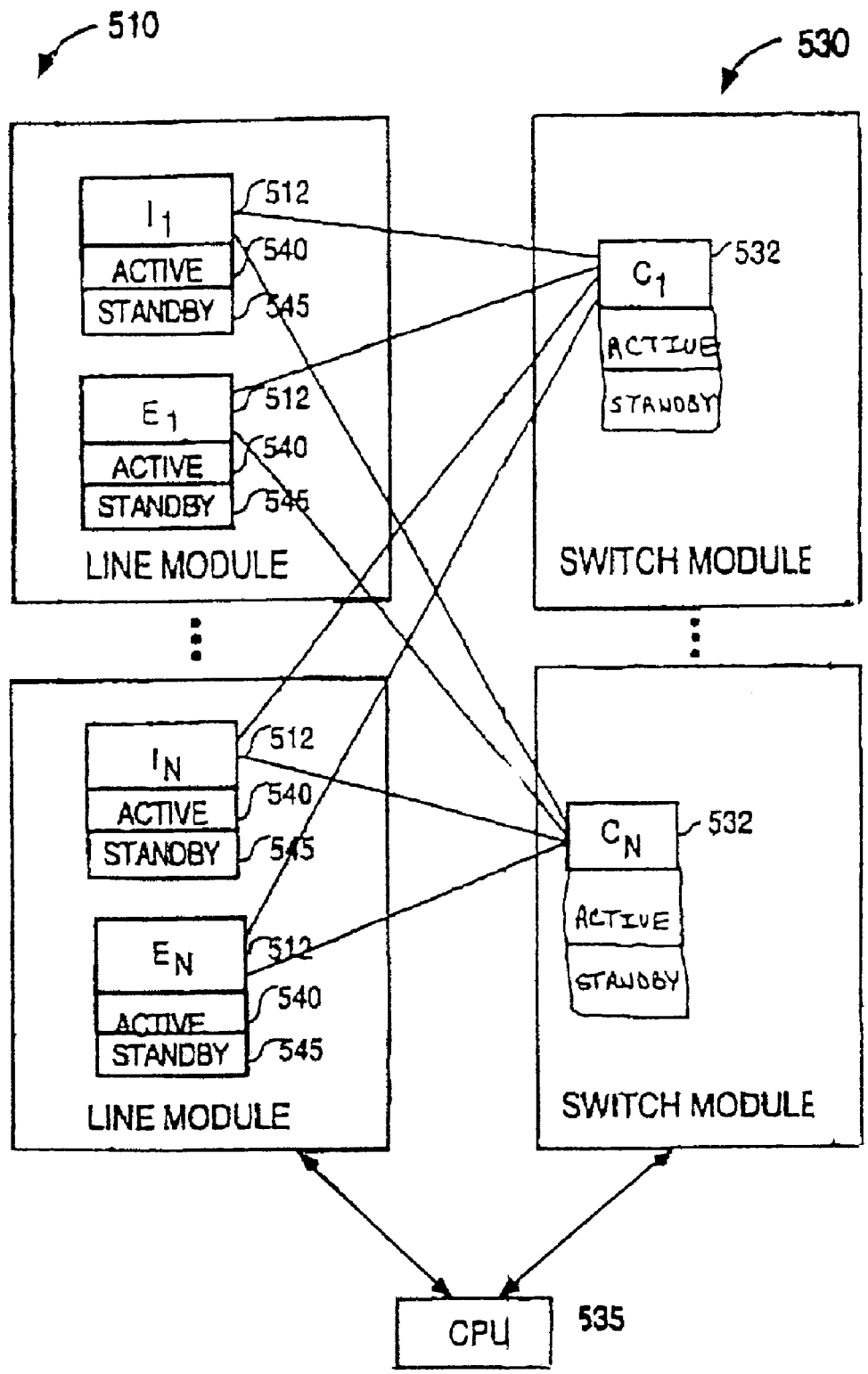
FIG. 5 is a block diagram illustrating a switch control mechanism that includes a Clos network configured in accordance with the logical model shown in FIG. 2.

FIG. 5 is a component diagram of a system 500 incorporating switch element 200, under an embodiment of the present invention. For example, a switch element such as described with FIG. 2 may include components distributed on modules of the system 500. The system 500 includes a plurality of line modules 510, and a plurality of switch modules 530. Each line module 510 includes an ingress device 512 and an egress device 514. The switch modules 530 include one or more center stage devices 532. The system also includes an active bank 540 and can include a stand-by bank 545. The active and stand-by banks may be part of the individual ingress, egress, and center devices 512, 514. One or more processing units accesses information stored in the banks 540, 545 to configure the ingress, egress, and center devices in line module 510 and center stage devices in switch module 530.

According to one embodiment, a plurality of framers is also provided on each line module 510. The framers frame communications from optical carriers (not shown). The system may be partitioned so that each framer represents one optical carrier. In the example shown, switch module 530 includes two center stage devices 532.

The processing unit 535 executes control algorithms to establish the configuration for the line modules 510 and the switch modules 530. Examples of control algorithms include Paull's algorithm, and the Looping algorithm. As discussed, these algorithms are executed to initially interconnect data lines across the switch element. The algorithms do not have to be used when a switching event occurs after the initial interconnections are made.

In an embodiment, line module 510 and switch module 530 are combinations of semi-conductor equipment. One or more of the framers 505, ingress devices 512 and egress devices 514 may each be on an individual semi-conductor chip and interconnected on line modules 510. Likewise, one or more of the center stage devices 532 may be on individual semi-conductor chips. One or more electrical connection exists between line modules 510 and switch modules 530. Each electrical connection provides an amount of bandwidth to enable exchange of electrical data of a particular size. Moreover, the data is exchanged in defined time slots. One or more ports on each of the line modules 510 and each of the switch modules 530 may provide the bandwidth.

When mapped to the logical model, each port of line module 510 and center stage module 530 corresponds to multiple edges to ingress devices 210 (FIG. 2), egress devices 220 (FIG. 2) and center stage devices 230 (FIG. 2). When center stage device 230 is flattened, one edge may carry one time slot. But on switch module 530, one port corresponds to multiple edges, for exchanging multiple time slots with one of the line modules 510.

To establish an initial configuration for the switch element 200, processing unit 535 executes the methods described above with respect to FIGS. 3*a* and 3*b* including executing a control algorithm to produce configuration information for initially configuring a portion of the switch element. The configuration may be stored in the stand-by bank 545. When the switch element 200 needs to be configured, data stored in the active bank 540 is swapped with the data stored in the stand-by bank 545. The active bank 540 is subsequently accessed to configure specific configurations of the ingress devices 512, egress devices 514, and center stage devices 532.

According to one embodiment, after the control algorithm completes the initial connection setup, a post-processing step is executed (i.e., by the logical switch controller 191 of switch control module 190), to complete the initial connection setup process. In response to a switching event, information already stored in the active bank 540 is used to reconfigure select center stage devices 532. The select center staged devices 532 can be bridged, multi-cast, selected, by passed or configured in some other manner to account for the switching event. One advantage provided by an embodiment of the invention is that a fast and selective rearrangement can be performed for connections to center stage devices, without need for re-executing a control algorithm, writing rearrangement data to the stand-by bank before performing the rearrangements, or swapping the active bank 540 with the stand-by bank 545. This is made possible by using a relatively trivial amount of configuration information to rearrange only selected devices in the switch element 100. In particular, only edge device connections to select center stage devices 532 are altered in a rearrangement.

In one implementation, there are 32 line modules and 15 switch modules. The bandwidth between line modules 510 and switch modules 530 provides for 18 ports for receiving communication frames. In this implementation, a switch element such as shown by FIG. 1 has 32 ingress devices 512, 32 egress devices 514, and 30 center stage devices 532. There are 12 ports for each line module, and 18 ports for each center stage module. The total bandwidth (or time slots available) into ingress devices 512 or egress devices 514 for the entire system 500 is 384 (12*32), while the bandwidth into all of the switch modules 530 is 540 (18*30).

The larger bandwidth of the switch module 530 illustrates some of the advantages of using center switch devices to perform rearrangements. In particular, not all of the center stage devices 532 need to be used. Rather than maximizing the number of center stage devices, a select number of center stage devices 532 may be employed to ensure symmetry between the ingress and egress edges of the system 500. The symmetry ensures that the outcome of rearrangements is predictable.

H. Operation Summary

The discussion above describes how the logical switch element may be reconfigured in response to a switching event. After the logical switch element 200 is reconfigured, the reconfiguration is mapped to a physical switch element to actually implement the reconfiguration. This mapping may be performed by a CPU running a set of software or by specialized logic components.

The following summarizes the overall modeling and reconfiguration process:

Derive a logical model, such as that shown in FIG. 2, for a physical switch element;

Identify a subset of the connections to be configured using the control algorithm including specifically leaving empty at least one port;

Run a control algorithm to determine an initial configuration for the logical model;

Map the initial configuration to the physical switch element to implement the configuration;

Do a post-processing step to configure the previously empty port including copying cross connects created using the control algorithm in one port to the previously empty port and adding or deleting any required cross connects in the center switches;

Detect a switching event;

Derive a new configuration for the logical model in response to the switching event; and Map the new configuration to the physical switch element to implement the new configuration.

Because the new configuration is determined using the logical model, and because the logical model is set up in the manner previously described, fast and selective reconfiguration is possible. These and other benefits can be realized with the present invention.

Thus far, the invention has been described with the assumption that the switch element 200 shown in FIG. 2 is a logical model of a physical switch element. It should be noted, though, that if so desired, the switch element 200 could be implemented as a physical switch element. That is, the ingress device, center stage, and egress device could be physically implemented as shown, using actual sorters, routers, etc. In such an implementation, no logical to physical mapping would be needed. This and other implementations are possible.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reconfiguring a switch element having a plurality of ingress devices operatively connected to ingress data lines, a plurality of egress devices operatively connected to egress data lines, and a plurality of center stage devices operatively interconnecting the ingress devices and the egress devices, the method comprising:

establishing an initial configuration for a plurality of connections between the ingress data lines and the egress data lines;

detecting a switching event that affects at least one of the plurality of connections;

selecting a portion of the plurality of connections, including one or more connections across at least one of the center stage devices; and rearranging only the selected connections across at least one of the center stage devices in response to the switching event;

wherein said establishing step establishes an initial configuration for a subset of connections that is a subset of a plurality of connections between the ingress data lines and the egress data lines, the step of establishing including:

identifying the subset of connections to be initially configured including specifically leaving available at least one port of the center stage device in the initial configuration;

executing a control algorithm to determine the initial configuration for the switch element including the subset of connections; and performing a post-processing step to complete the plurality of connections.

2. The method according to claim 1, said post-processing step operable to configure the at least one previously empty port including copying cross-connects created using the control algorithm in a port to the previously empty port and adding or deleting any required cross connects in the center stage devices.

3. The method of claim 1, wherein said establishing step includes creating portions of connections that are subsequently completed in said rearranging step.

4. The method of claim 1, wherein said establishing step includes creating portions of connections that are subsequently completed in said post-processing step.

5. The method of claim 1, wherein the control algorithm is selected from Paull's Algorithm and the Looping Algorithm.

6. The method of claim 1, wherein the step of post-processing includes a center copy operation.

7. The method of claim 1, wherein the switch element is a three stage Clos network, and wherein the step of post-processing includes adding cross-connects in the center stage device of the three stage Clos network.

8. The method of claim 7, wherein the step of adding cross connects includes adding a mirror copy of cross connects for another port.

9. The method of claim 1, wherein said post-processing step includes deleting cross connects.

10. The method of claim 1, wherein said post-processing step does not include executing the control algorithm.

11. The method of claim 1 wherein the step of selecting a portion includes identifying connections set-up in post processing that are associated with a predefined switch event.

12. The method of claim 1 wherein the step of rearranging includes rearranging connections including adding or deleting connections to complete identified passthrough connections.

13. The method of claim 1, further comprising:

mapping the initial configuration to a physical switch element to implement the configuration.

14. A method for switching connections across a switch element, the switch element configured as node in a ring network and operable to drop data from one port to a drop port and add data from the drop port to a second port of the switch element, the switch element including one or more ingress devices connected to the first port, one or more egress devices connected to the second port, and a set of center stage devices connected there between, the method comprising:

configuring the switch element to connect multiple ingress devices in the set of ingress devices to multiple egress devices in the set of egress devices across a first center stage device in the set of center stage devices, the configuring step including identifying a subset of the plurality of connections to be configured using a control algorithm including specifically leaving empty at least one port, executing a control algorithm to determine an initial configuration for the switch element including creating the subset of connections and a pre-defined mapping of connections from each ingress device and egress device to the center stage devices; and performing a post-processing step to complete the plurality of connections, the post-processing step operable to configure the previously empty port including copying cross-connects created using the control algorithm in a port to the previously empty port and adding and deleting any required cross connects in the center switches.

15. The method of claim 14, in response to detecting a switching event selecting from the first center stage device to connect a new ingress device to one of the multiple egress device connected to the first center stage device;

selecting from the first center stage device to connect a new egress device to one of the multiple ingress devices connected to the first center stage device; and bridging from the first center stage device to connect a new egress device to one of the multiple ingress devices in the set of ingress devices.

16. The method of claim 14 wherein the step of executing a control algorithm to determine an initial configuration for the logical model including the subset of connections includes mapping the initial configuration to the physical switch element to implement the configuration.

17. A method for switching connections across a switch element, the switch element configured as node in a ring network and operable to drop data from one port to a drop port and add data from the drop port to a second port of the switch element, the switch element including a Clos network including ingress stages, center stages and egress stages, the method comprising:

identifying a set of connections to pass data among the ports;

configuring the switch element to create the connections including identifying a subset of the connections to be configured using a control algorithm including specifically leaving empty at least one port;

executing a control algorithm to determine an initial configuration for the switch element including creating the subset of connections and a pre-defined mapping of connections from the ingress stage and egress stage to the center stage; and performing a post-processing step to complete the plurality of connections, the post-processing step operable to configure the previously empty port including copying cross-connects created using the control algorithm in a port to the previously empty port and adding and deleting any required cross connects in the center switches.

18. A method for switching connections across a switch element, the switch element configured as node in a ring network and operable to drop data from one port to a drop port and add data from the drop port to a second port of the switch element, the switch element including a Clos network including ingress, center and egress stages, the method comprising:

identifying a set of connections to pass data among the ports;

configuring the switch element to create the connections including identifying a subset of the connections to be configured using a control algorithm including specifically leaving empty at least one port;

executing a control algorithm to determine an initial configuration for the switch element including creating the subset of connections and a pre-defined mapping of connections from the ingress stage and egress stage to the center stage; and performing a post-processing step to complete the plurality of connections without executing the control algorithm, the post-processing step operable to configure the previously empty port.

19. The method of claim 18, further comprising:

detecting a switching event and rearranging only select parts of the logical center stage devices in response to the switching event, wherein the rearrangements may provide for either selecting the center stage device to receive communications from a new ingress stage switching device, or bridging/multi-casting communications on the logical center stage switching device from one egress stage switching device to one or more other egress stage switching devices.

20. A switch element, comprising:

ingress devices operatively and respectively connected to ingress data lines, each of said ingress devices including an input sorter and input routers;

egress devices operatively and respectively connected to egress data lines, each of said egress devices including output routers and an output sorter; and center stage devices operatively and selectively interconnecting said ingress devices and said egress devices;

wherein the input sorter associated with each of said ingress devices operatively connects a respective one of the ingress data lines to a plurality of the input routers, wherein the output sorter associated with each of the egress devices operatively connects a respective one of the egress data lines to a plurality of the output routers, wherein the input routers operatively and selectively interconnect one of the ingress data lines with a respective input port of said center stage devices, wherein the output routers operatively and selectively interconnect one of the egress data lines with a respective output port of said center stage devices; and wherein the center stage devices are logical center stage switches modeling physical center stage switch devices to expand a number of edges and decrease a number of time slots per edge with respect to the physical center stage switch, wherein edges correspond to links between said ingress devices and said center stage devices and links between said center stages devices and said egress devices.

21. The switch element according to claim 20, wherein the input routers, center stage devices and output routers form a Clos network.

22. The switch element according to claim 20, wherein each ingress router receives data from only one ingress data line and wherein each egress router forwards data to only one egress data line.

23. The switch element according to claim 22, wherein one or more of the ingress routers receive data from the same ingress data line.

24. The switch element according to claim 22, wherein one or more of the egress routers forward data to the same egress data line.

25. The switch element according to claim 20, wherein the input and output sorters allow switching across a subset of the input and output routers.

26. The switch element according to claim 20,
  wherein the center stage devices are physical center stage switches being modeled as logical center stage switch devices to expand a number of edges and reduce a number of time slots per edge with respect to the physical center stage switch, and
  wherein edges correspond to links between said ingress devices and said center stage devices and links between said center stages devices and said egress devices.

27. The switch element according to claim 26,
  wherein each of the logical center stage devices has one time slot per edge.

28. The switch element according to claim 20,
  wherein the physical center stage switch has 32 physical edges and 16 time slots per edge and the logical center stage device has 512 edges and one time slot per edge.

29. The switch element according to claim 20,
  wherein the input and output sorters are partitioned such that each partition of the sorters handles a set of connections with an associated one of the routers and such that no connection may cross a partition line.

30. The switch element according to claim 20, further comprising:
  a switch control module for controlling the switch element.

31. A method for configuring a switch element having ingress devices, egress devices and center stage devices operatively interconnecting the ingress and egress devices, comprising:
  partitioning the switch element into a logical model including input routers and output routers partitioned within the ingress and egress devices, respectively, wherein each of the partitioned routers within the logical model is assigned to only one data line;
  determining a subset of excluded connections in an initial configuration of the switch element;
  executing a control algorithm for the connections not present in the subset to establish the initial configuration of the switch element, wherein the subset of excluded connections is excluded from consideration during execution of the control algorithm to establish the initial configuration; and
  post-processing the subset of excluded connections;
  wherein the subset of excluded connections determined by said determining step includes the point-to-multipoint connections and said post processing step post-processes the non-point-to-point connections,
  said executing step executing the control algorithm for point-to-point connections.

32. The method according to claim 31,
  wherein the subset of excluded connections determined by said determining step includes protection connections and said post processing step post-processes the protection connections,
  said executing step executing the control algorithm for working connections.

33. The method according to claim 31, further comprising:
  processing protection events in switch element without invoking a rearrangement algorithm.

34. The method according to claim 31, said partitioning step:
  establishing a partitioning of the switch element into a logical model which allows arbitrary line level multicast;
  establishing a partitioning of the switch element into a logical model that allows processing of line level protection such that only the lines affected by a protection event require processing; and
  allowing an association between lines or portions of lines to allow arbitrary path level multicast within that association and allowing processing of protection events on those paths to be completed without affecting other paths in the switch element.

35. The method according to claim 31, further comprising:
  updating connections for a protection event in an active bank for fast protection event processing without adversely affecting other connections in the switch element.

* * * * *